US009610497B2

United States Patent
Yamada et al.

(10) Patent No.: US 9,610,497 B2
(45) Date of Patent: Apr. 4, 2017

(54) STORAGE MEDIUM, IMAGE PROCESSING APPARATUS, IMAGE PROCESSING METHOD, AND IMAGE PROCESSING SYSTEM

(75) Inventors: Yoichi Yamada, Kyoto (JP); Shigeyuki Asuke, Kyoto (JP); Hidemaro Fujibayashi, Kyoto (JP); Kenji Matsutani, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 769 days.

(21) Appl. No.: 13/239,598

(22) Filed: Sep. 22, 2011

(65) Prior Publication Data

US 2012/0308117 A1 Dec. 6, 2012

(30) Foreign Application Priority Data

Jun. 3, 2011 (JP) ................................. 2011-124973

(51) Int. Cl.
*G06T 15/00* (2011.01)
*A63F 13/5255* (2014.01)

(52) U.S. Cl.
CPC .... *A63F 13/5255* (2014.09); *A63F 2300/609* (2013.01); *A63F 2300/6045* (2013.01); *A63F 2300/6661* (2013.01)

(58) Field of Classification Search
USPC ...... 345/418–427; 463/31–33; 715/848–852; 348/42; 382/285
See application file for complete search history.

(56) References Cited

U.S. PATENT DOCUMENTS

| 7,535,460 B2 | 5/2009 | Momose |
| 8,610,744 B2 * | 12/2013 | Harris ........................... 345/661 |
| 2002/0090993 A1 * | 7/2002 | Koshiro et al. ................. 463/30 |

(Continued)

FOREIGN PATENT DOCUMENTS

| JP | 2005-346467 | 12/2005 |
| JP | 2006-314586 | 11/2006 |

(Continued)

OTHER PUBLICATIONS

Shannen Cristobal, The Legend of Zelda: Phantom Hourglass—Sacred Crest, May 19, 2008, YouTube Screen Shots, https://www.youtube.com/watch?v=y2W6M8xl1Vl.*

(Continued)

*Primary Examiner* — Xiao Wu
*Assistant Examiner* — Mohammad H Akhavannik
(74) *Attorney, Agent, or Firm* — Nixon & Vanderhye P.C.

(57) ABSTRACT

An example of a game apparatus as an image processing apparatus includes a CPU, and the CPU controls a movement, etc. of a player object according to an instruction from a player. In a case that a predetermined condition is satisfied, a two-dimensional surface is displayed within a virtual three-dimensional space. When the player moves a first controller, a two-dimensional image is depicted on the two-dimensional surface in response thereto. Then, it is determined whether or not the depicted two-dimensional image is a predetermined image. If it is determined that the two-dimensional image is the predetermined image, a three-dimensional object corresponding to the predetermined image appears, and the two-dimensional surface and the two-dimensional image depicted thereon are erased.

15 Claims, 23 Drawing Sheets

(56) References Cited

U.S. PATENT DOCUMENTS

2004/0210852 A1\* 10/2004 Balakrishnan et al. ...... 715/856
2010/0292010 A1    11/2010 Kira et al.

FOREIGN PATENT DOCUMENTS

JP    2009-064364    3/2009
JP    2010-264171    11/2010

OTHER PUBLICATIONS

Zelda Dungeun, Phantom Hourglass : Walkthrough 14.1 Isle of Ruins, Apr. 19, 2010, p. 4/11, http://www.zeldadungeon.net/Zelda12-phantom-hourglass-walkthrough-14.php.\*
Ravin Balakrishnan, Exploring Bimanual Camera Control and Object Manipulation in 3D Graphics Interfaces, 1999, ACM Conference on Human Factors in Computing Systems , 56-63.\*
Tanaka, K., et al., "Takt of Magic Complete Clear Guide Book," published by ENTERBRAIN, Jun. 4, 2009, pp. 8-12, with a corresponding concise explanation of relevance found in the Sep. 15, 2015 Office Action.
Japanese Office Action issued in Application No. 2011-124973 dated Sep. 15, 2015 with English Translation.

\* cited by examiner (A)

(B)

(C)

(A)

(B)

SETTING METHOD OF TWO-DIMENSIONAL SURFACE

WORLD COORDINATES SYSTEM (A) DETERMINATION OF HEART (B) DETERMINATION OF CIRCLE

STORAGE MEDIUM, IMAGE PROCESSING APPARATUS, IMAGE PROCESSING METHOD, AND IMAGE PROCESSING SYSTEM

CROSS REFERENCE OF RELATED APPLICATION

The disclosure of Japanese Patent Application No. 2011-124973 filed on Jun. 3, 2011 is incorporated herein by reference.

FIELD

The example embodiment relates to a storage medium, an image processing apparatus, an image processing method and an image processing system. More specifically, the example embodiment relates to a storage medium, image processing apparatus, image processing method and image processing system which depicts a two-dimensional image according to an operation by an operator.

SUMMARY

It is a primary object of the example embodiment to provide a novel storage medium, image processing apparatus, image processing method and image processing system.

Another object of the example embodiment is to provide a storage medium, image processing apparatus, image processing method and image processing system which increases interest by raising a difficulty level for depicting a two-dimensional image.

A first example embodiment is a storage medium storing an image processing program of an image processing apparatus including an operator, the image processing program causes a computer of an image processing apparatus to function as an image outputter, a condition determiner, a two-dimensional surface generator, and a depicter. The image outputter outputs an image obtained by imaging a virtual three-dimensional space with a virtual camera. The condition determiner determines whether or not a predetermined condition is satisfied. The two-dimensional surface generator generates a two-dimensional surface in the virtual three-dimensional space when it is determined that the predetermined condition is satisfied. The depicter depicts a two-dimensional image on the two-dimensional surface in accordance with an operation by the operator.

According to the first example embodiment, when the predetermined condition is satisfied, the two-dimensional surface is displayed in the virtual three-dimensional space, and on the two-dimensional surface, a two-dimensional image is depicted, and therefore, a difficulty level for depicting a two-dimensional image can be raised, capable of increasing fun of the game.

A second example embodiment is according to the first example embodiment, wherein the two-dimensional surface generator generates the two-dimensional surface at a position a predetermined distance away from the virtual camera, and the depicter depicts a dot at an intersection point between a straight line extending from the virtual camera to the two-dimensional surface and the two-dimensional surface.

According to the second example embodiment, depicting is made with the two-dimensional surface viewed from the subjective viewpoint, and therefore, it is possible to improve operability for depicting.

A third example embodiment is according to the second example embodiment, wherein the image processing program causes the computer to further function as an arranger which arranges a predetermined object in the virtual three-dimensional space and moves the predetermined object according to an operation by the operator, and the straight line passes through an arrangement position of the virtual camera and a predetermined point of the predetermined object. Accordingly, a dot is depicted in the position designated by the predetermined point of the predetermined object on the two-dimensional surface.

According to the third example embodiment, a dot is depicted in the position designated by the predetermined point of the predetermined object on the two-dimensional surface, and therefore, it is possible to give a sense of being absorbed as if he or she makes depiction by using the predetermined object.

A fourth example embodiment is according to the third example embodiment, wherein the predetermined object includes a player object, and the predetermined condition is that the player object to be controlled according to an operation by the operator reaches a predetermined position or a predetermined area in the virtual three-dimensional space.

According to the fourth example embodiment, when the player object reaches the predetermined position, the two-dimensional surface is displayed, and therefore, it is possible to raise the difficulty level for displaying the two-dimensional surface and give the user or the player an enjoyment of finding a predetermined position, capable of increasing interest and fun.

A fifth example embodiment is according to the fourth example embodiment, wherein the image outputter outputs an image of an objective viewpoint when the virtual camera is arranged behind the player object before the predetermined condition is satisfied, and outputs an image of a subjective viewpoint when the virtual camera is arranged on the player object after the predetermined condition is satisfied.

According to the fifth example embodiment, before the predetermined condition is satisfied, the predetermined object is moved with a relatively large range of the virtual three-dimensional space viewed from the objective viewpoint, and after the predetermined condition is satisfied, the predetermined object is moved with the two-dimensional surface viewed from the subjective viewpoint, and this makes it easy to view the two-dimensional surface in depicting.

A sixth example embodiment is according to the first example embodiment, wherein the predetermined condition is that a predetermined operation is performed by the operator.

According to the sixth example embodiment, according to the predetermined operation, the two-dimensional surface is displayed, and therefore, it is possible to raise the difficulty level for displaying the two-dimensional surface, capable of interest and fun.

A seventh example embodiment is according to the sixth example embodiment, wherein the image processing program causes the computer to further function as an attitude detector which detects an attitude of the operator, and the predetermined operation includes a fact that the operator takes a predetermined attitude.

According to the seventh example embodiment, the predetermined operation includes a fact that that the operator takes a predetermined attitude, and therefore, if the operator takes the predetermined attitude according to a rendition of the virtual game, for example, an intuitive operation may be made possible.

An eighth example embodiment is according to the first example embodiment, wherein the image processing program causes the computer to further function as an attitude detector which detects an attitude of the operator, and the depicter depicts a two-dimensional image on the two-dimensional surface on the basis of the attitude of the operator detected by the attitude detector. That is, if the operator is moved, the two dimensional image is depicted in conjunction therewith.

According to the eighth example embodiment, the two-dimensional image is depicted in conjunction with the movement of the operator, and thus, an intuitive operation may be made possible. Furthermore, for example, the operator is moved in the air in the real space, and therefore, it is possible to raise the difficulty level for depicting.

A ninth example embodiment is according to the first example embodiment, wherein the image processing program causes the computer to further function as a converter which converts the two-dimensional image depicted by the depicter into a three-dimensional object.

According to the ninth example embodiment, it is possible to convert the depicted two-dimensional image into the three-dimensional object.

A tenth example embodiment is according to the ninth example embodiment, wherein the image processing program causes the computer to further function as an erasure which erases the two-dimensional surface from the virtual three-dimensional space when the two-dimensional image depicted by the depicter is converted into the three-dimensional object by the converter.

According to the tenth example embodiment, the depicted two-dimensional image is converted into the three-dimensional object, capable of increasing fun for depicting.

An eleventh example embodiment is according to the ninth example embodiment, wherein the image processing program causes the computer to further function as an image determiner which determines whether or not the two-dimensional image depicted by the depicter is a predetermined image.

According to the eleventh example embodiment, whether or not the depicted two-dimensional image is the predetermined image is determined, and therefore, it is possible to make conversion into the three-dimensional object only when the predetermined image is determined. Accordingly, it is possible to raise the difficulty level of depicting and increase the fun of the game.

A twelfth example embodiment is according to the eleventh example embodiment,
wherein the image determiner determines whether or not the two-dimensional image is the predetermined image on the basis of at least the number of corners included in the two-dimensional image and position of the corners within a range surrounding the two-dimensional image.

According to the twelfth example embodiment, whether or not the depicted two-dimensional image is the predetermined image is determined, and if the predetermined image is determined, conversion into the predetermined three-dimensional object which is brought into correspondence with the predetermined image may be made.

A thirteenth example embodiment is according to the eleventh example embodiment, wherein the image determiner determines whether or not the two-dimensional image is the predetermined image on the basis of at least the number of dots included in each area in a case that the range surrounding the two-dimensional image is equally divided, a horizontal to vertical ratio of the two-dimensional image, and the number of corners included in the two-dimensional image.

According to the thirteenth example embodiment, similar to the twelfth example embodiment, in a case that it is determined that the depicted two-dimensional image is the predetermined image, conversion into the predetermined three-dimensional object which is brought into correspondence with the predetermined image may be made.

A fourteenth example embodiment is according to the ninth example embodiment, wherein the image processing program causes the computer to further function as a three-dimensional object displayer which displays the three-dimensional object prepared in advance when the two-dimensional image is converted into the three-dimensional object by the converter.

According to the fourteenth example embodiment, after the two-dimensional image is depicted, the converted three-dimensional object is displayed, and thus, it is possible to judge whether precise depiction is made. Also, depicting itself can be enjoyed.

A fifteenth example embodiment is an image processing apparatus including an operator, following: an image outputter which outputs an image obtained by imaging a virtual three-dimensional space with a virtual camera; a condition determiner which determines whether or not a predetermined condition is satisfied; a two-dimensional surface generator which generates a two-dimensional surface in the virtual three-dimensional space when it is determined that the predetermined condition is satisfied; and a depicter which depicts a two-dimensional image on the two-dimensional surface in accordance with an operation by the operator.

A sixteenth example embodiment is an image processing method of an image processing apparatus including an operator, including steps of: (a) outputting an image obtained by imaging a virtual three-dimensional space with a virtual camera; (b) determining whether or not a predetermined condition is satisfied; (c) generating a two-dimensional surface in the virtual three-dimensional space when it is determined that the predetermined condition is satisfied, and (d) depicting a two-dimensional image on the two-dimensional surface in accordance with an operation by the operator.

A seventeenth example embodiment is an image processing system including an operator, comprising: an image outputter which outputs an image obtained by imaging a virtual three-dimensional space with a virtual camera; a condition determiner which determines whether or not a predetermined condition is satisfied; a two-dimensional surface generator which generates a two-dimensional surface in the virtual three-dimensional space when it is determined that the predetermined condition is satisfied; and a depicter which depicts a two-dimensional image on the two-dimensional surface in accordance with an operation by the operator.

In the fifteenth or the seventeenth example embodiment as well, similar to the first example embodiment, a difficulty level for depicting a two-dimensional image can be raised, capable of increasing fun of the game.

The above described objects and other objects, features, aspects and advantages of the example embodiment will become more apparent from the following detailed descrip-

DETAILED DESCRIPTION OF NON-LIMITING EXAMPLE EMBODIMENTS

Figure 1:
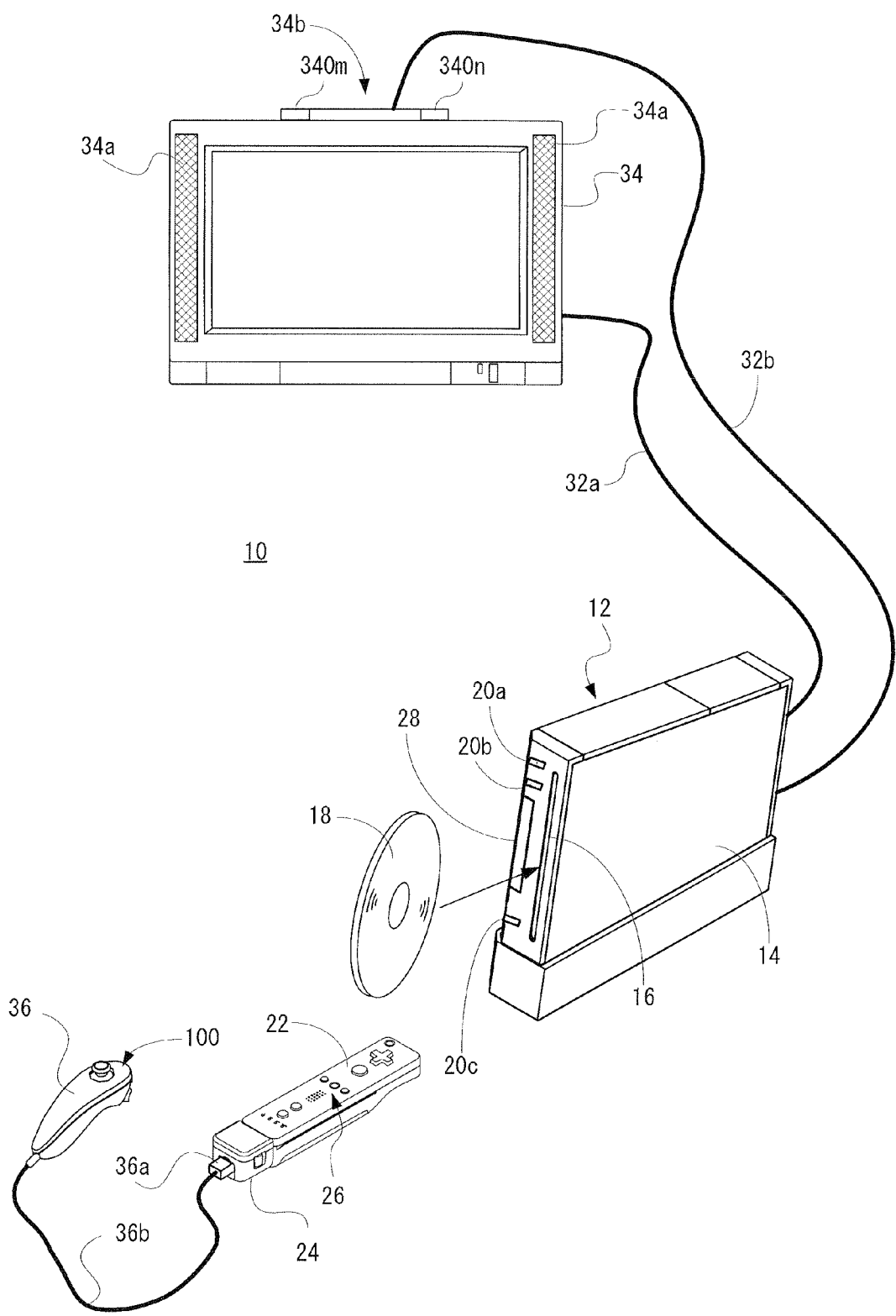
FIG. 1 shows an example non-limiting game system.

Referring to FIG. 1, a game system 10 of the non-limiting example embodiment includes a video game apparatus (hereinafter, simply referred to as "game apparatus") 12 functioning as an image processing apparatus and a first controller 22. Although illustration is omitted, the game apparatus 12 of this embodiment is designed such that it can be connected with up to four controllers 22. Furthermore, the game apparatus 12 and the respective controllers 22 are connected by a wireless manner. The wireless communication is executed according to a Bluetooth (registered trademark) standard, for example, but may be executed by other standards such as infrared rays, a wireless LAN. In addition, it may be connected by a wire. Furthermore, in this embodiment, the first controller 22 is connected (coupled) with a gyro unit 24, and the gyro sensor 24 is connected with a second controller 36 via an attachment plug 36a and a cable 36b.

Although illustration is omitted, in a case that the gyro unit 24 is not attached to the first controller 22, the second controller 36 can be connected to the first controller 22 via the attachment plug 36a and the cable 36b.

The gyro unit 24 is couple to the first controller 22 to thereby physically and electrically be connected to the first controller 22. Accordingly, from the gyro unit 24 attached (integrated) to the first controller 22, angular velocity data indicating the angular velocity of the first controller 22 is output and applied to the first controller 22.

Furthermore, operation data or input data of the second controller 36 is applied to the first controller 22 via the cable 36b, the attachment plug 26b and the gyro unit 24.

Accordingly, the first controller 22 transmits to the game apparatus 12 the angular velocity data from the gyro unit 24 and the operation data or the input data from the second controller 36 as well as the operation data or the input data from the first controller 22 itself.

Here, in a case that the gyro unit 24 is not attached to the first controller 22, the operation data or the input data from the second controller 36 is applied to the first controller 22 via the cable 36b and the attachment plug 36a.

Returning to FIG. 1, the game apparatus 12 includes a roughly rectangular parallelepiped housing 14, and the housing 14 is furnished with a disk slot 16 on a front surface. Through the disk slot 16, an optical disk 18 as one example of an information storage medium storing game program, etc. is inserted to be loaded into a disk drive 54 (see FIG. 2) within the housing 14. Although illustration is omitted, around the disk slot 16, an LED and a light guide plate are arranged such that the LED of the disk slot 16 can light on or blink on and off in accordance with various processing.

Furthermore, on the upper front surface of the housing 14 of the game apparatus 12, a power button 20a and a reset button 20b are provided, and below them, an eject button 20c is provided. In addition, a connector cover for external memory card 28 is provided between the reset button 20b and the eject button 20c, and in the vicinity of the disk slot 16. Inside the connector cover for external memory card 28, a connector for external memory card 62 (see FIG. 2) is provided, through which an external memory card (hereinafter simply referred to as a "memory card") not shown is inserted. The memory card is employed for loading the game program, etc. read from the optical disk 18 to temporarily store it, storing (saving) game data (result data or proceeding data of the game) of the game played by means of the game system 10, and so forth. It should be noted that storing the game data described above may be performed on an internal memory, such as a flash memory 44 (see FIG. 2) inside the game apparatus 12 in place of the memory card. Also, the memory card may be utilized as a backup memory for the internal memory. In addition, in the game apparatus 12, other applications except for the game may be executed, and in such a case, data of the other applications can be stored in the memory card.

Here, a general-purpose SD card can be employed as a memory card, but other general-purpose memory cards, such as memory sticks, a multimedia card (registered trademark) can be employed.

Although omitted in FIG. 1, the game apparatus 12 has an AV cable connector 58 (FIG. 2) on a rear surface of the housing 14, and by utilizing the AV cable connector 58, a monitor 34 and a speaker 34a are connected to the game apparatus 12 through an AV cable 32a. The monitor 34 and the speaker 34a are typically a color television receiver, and through the AV cable 32a, a video signal from the game apparatus 12 is input to a video input terminal of the color television, and a sound signal from the game apparatus 12 is input to a sound input terminal. Accordingly, a game image of a three-dimensional (3D) video game, for example, is displayed on the screen of the color television (monitor) 34, and stereo game sound, such as a game music, a sound effect, etc. is output from the right and left speakers 34a. Around the monitor 34 (on the top side of the monitor 34, in this embodiment), a marker unit 34b including two infrared ray LEDs (markers) 340m and 340n is provided. The marker unit 34b is connected to the game apparatus 12 through a power source cable 32b. Accordingly, the marker unit 34b is supplied with power from the game apparatus 12. Thus, the markers 340m and 340n emit lights ahead of the monitor 34.

Furthermore, the power of the game apparatus 12 is applied by means of a general AC adapter (not illustrated). The AC adapter is inserted into a standard wall socket for home use, and the game apparatus 12 transforms the house current (commercial power supply) to a low DC voltage signal suitable for driving. In another embodiment, a battery may be utilized as a power supply.

In the game system 10, a user or a player turns the power of the game apparatus 12 on for playing the game (or applications other than the game). Then, the user selects an appropriate optical disk 18 storing a program of a video game (or other applications the player wants to play), and loads the optical disk 18 into the disk drive 54 of the game apparatus 12. In response thereto, the game apparatus 12 starts to execute a video game or other applications on the basis of the program recorded in the optical disk 18. The user operates the first controller 22 in order to apply an input to the game apparatus 12. For example, by operating any one of the inputter 26, a game or other application is started. Besides the operation of the inputter 26, by moving the first controller 22 itself, it is possible to move a moving image object (player object) in different directions or change a perspective of the user (camera position) in a 3-dimensional game world.

Here, programs of the video game and other applications may be stored (installed) in an internal memory (flash memory 44 (see FIG. 2)) of the game apparatus 12 so as to be executed from the internal memory. In such a case, programs stored in a storage medium like an optical disk 18 may be installed onto the internal memory, or downloaded programs may be installed onto the internal memory.

Figure 2:
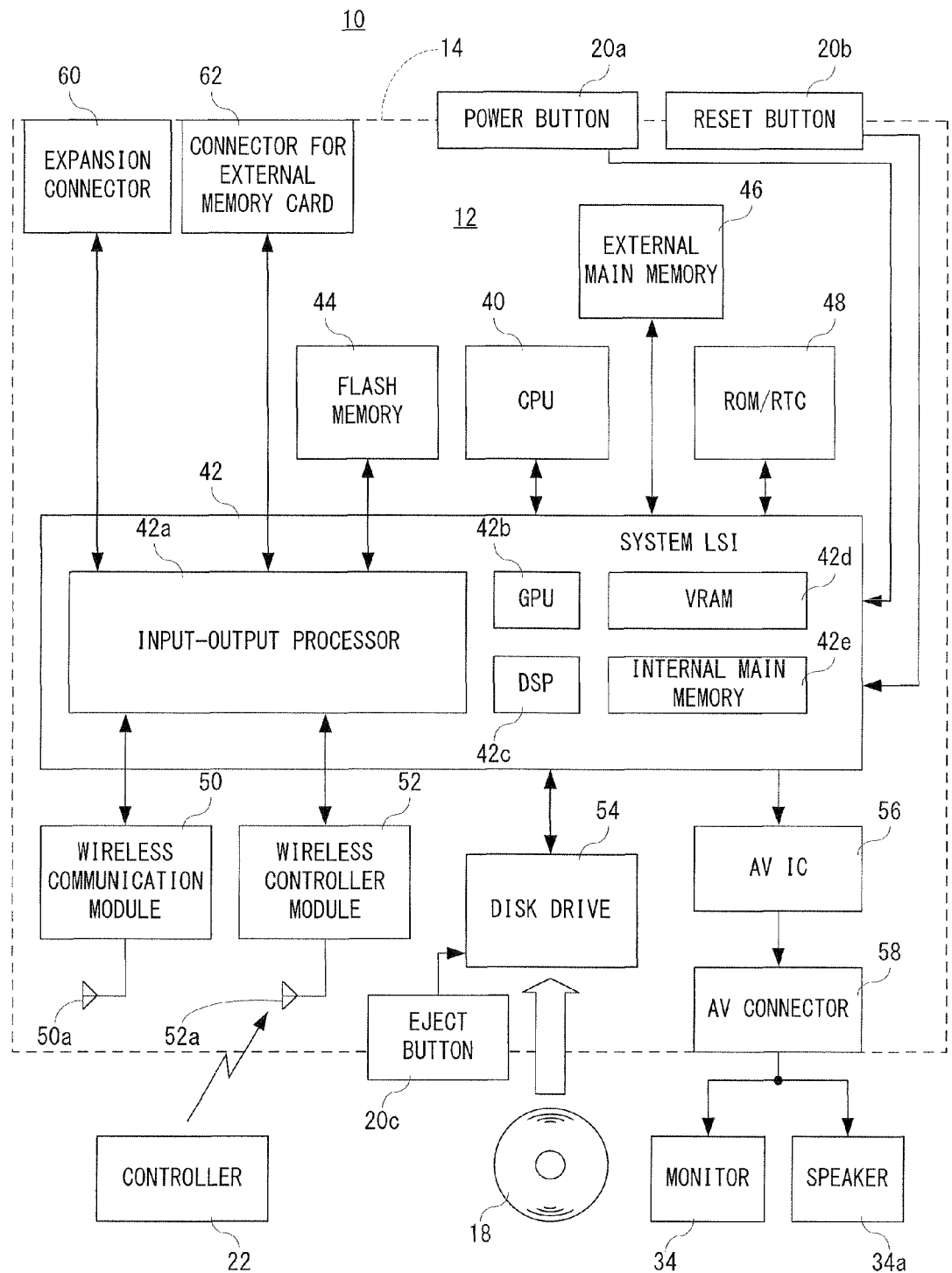
FIG. 2 shows an example non-limiting electric configuration of the game system shown in FIG. 1.

FIG. 2 is a block diagram showing an electric configuration of the video game system 10 in FIG. 1 embodiment. Although illustration is omitted, the respective components within the housing 14 are mounted on a printed board. As shown in FIG. 2, the game apparatus 12 has a CPU 40. The CPU 40 functions as a game processor. The CPU 40 is connected with a system LSI 42. The system LSI 42 is connected with an external main memory 46, a ROM/RTC 48, a disk drive 54, and an AV IC 56.

The external main memory 46 is utilized as a work area or a buffer area of the CPU 40 for storing programs like a game program, etc., and various data. The ROM/RTC 48, the so-called boot ROM, is incorporated with a program for activating the game apparatus 12, and provided with a time circuit for counting a time. The disk drive 54 reads a program, image data, sound data, etc. from the optical disk 18, and writes them in an internal main memory 42e described later or the external main memory 46 under the control of the CPU 40.

The system LSI 42 is provided with an input-output processor 42a, a GPU (Graphics Processor Unit) 42b, a DSP (Digital Signal Processor) 42c, a VRAM 42d and an internal main memory 42e. These are connected with each other by internal buses although illustration is omitted. The input-output processor (I/O processor) 42a executes transmission and reception of data, downloads of data, and so forth. A description as to transmission and reception and download of the data follows later.

The GPU 42b is made up of a part of a depicter, and receives a graphics command construction command) from the CPU 40 to generate game image data according to the command. Additionally, the CPU 40 applies an image generating program required for generating game image data to the GPU 42b in addition to the graphics command.

Although illustration is omitted, the GPU 42b is connected with the VRAM 42d as described above. The GPU 42b accesses the VRAM 42d to acquire the data (image data: data such as polygon data, texture data, etc.) required to execute the construction command. Additionally, the CPU 40 writes the image data required for drawing to the VRAM 42d via the GPU 42b. The GPU 42b accesses the VRAM 42d to create game image data for drawing.

In this embodiment, a description is made on a case that the GPU 42b generates game image data, but in a case of executing an arbitrary application except for the game application, the GPU 42b generates image data as to the arbitrary application.

Furthermore, the DSP 42c functions as an audio processor, and generates audio data corresponding to a sound, a voice, music, or the like by means of the sound data and the sound wave (tone) data which are stored in the internal main memory 42e and the external main memory 46.

The game image data and audio data which are generated as described above are read by the AV IC 56, and output to the monitor 34 and the speaker 34a via the AV connector 58. Accordingly, a game screen is displayed on the monitor 34, and a sound (music) necessary for the game is output from the speaker 34a.

Furthermore, the input-output processor 42a is connected with a flash memory 44, a wireless communication module 50, a wireless controller module 52, an expansion connector 60 and a connector for external memory card 62. The wireless communication module 50 is connected with an antenna 50a, and the wireless controller module 52 is connected with an antenna 52a.

Although illustration is omitted, the input-output processor 42a can communicate with other game apparatuses and various servers that are connected to a network via the wireless communication module 50. It should be noted that it is possible to directly communicate with other game apparatuses without going through the network. The input-output processor 42a periodically accesses the flash memory 44 to detect the presence or absence of data (referred to as transmission data) required to be transmitted to a network, and transmits it to the network via the wireless communication module 50 and the antenna 50a in a case that the transmission data is present. Furthermore, the input-output processor 42a receives data (referred to as reception data) transmitted from other game apparatuses via the network, the antenna 50a and the wireless communication module 50, and stores the reception data in the flash memory 44. If the reception data does not satisfy a predetermined condition, the reception data is abandoned as it is. In addition, the input-output processor 42a receives data (download data) downloaded from the download server via the network, the antenna 50a and the wireless communication module 50, and stores the download data in the flash memory 44.

Furthermore, the input-output processor 42a receives controller data transmitted from the first controller 22 via the antenna 52a and the wireless controller module 52, and (temporarily) stores it in the buffer area of the internal main memory 42e or the external main memory 46. The controller data is erased from the buffer area after being utilized in the processing by the CPU 40 (game processing, for example).

In this embodiment, as described above, the wireless controller module 52 performs a communication with the first controller 22 in accordance with Bluetooth standards. In FIG. 2, for simplicity, the gyro unit 24 and the second controller 36 are omitted.

In addition, the input-output processor 42a is connected with the expansion connector 60 and the connector for external memory card 62. The expansion connector 60 is a connector for interfaces, such as USB, SCSI, etc., and can be connected with medium such as an external storage, and peripheral devices such as other controllers different from the first controller 22 and the second controller 36. Furthermore, the expansion connector 60 is connected with a cable LAN adaptor, and the cable LAN can be used in place of the wireless communication module 50. The connector for external memory card 62 can be connected with an external storage like a memory card. Thus, for example, the input-output processor 42a accesses the external storage via the expansion connector 60 and the connector for external memory card 62 to store and read the data.

Although a detailed description is omitted, the game apparatus 12 (housing 14) is furnished with the power button 20a, the reset button 20b, and the eject button 20c as shown in FIG. 1. The power button 20a is connected to the system LSI 42. When the power button 20a is turned on, the system LSI 42 is set to a mode of a normal energized state in which the respective components of the game apparatus 12 are supplied with power through an AC adapter not shown (referred to as "normal mode"). On the other hand, when the power button 20a is turned off, the system LSI 42 is set to a mode in which only a part of the components of the game apparatus 12 is supplied with power, and the power consumption is reduced to minimum (hereinafter referred to as a "standby mode").

In this embodiment, in a case that the standby mode is set, the system LSI 42 issues an instruction to stop supplying the power to the components except for the input-output processor 42a, the flash memory 44, the external main memory 46, the ROM/RTC 48, the wireless communication module 50, and the wireless controller module 52. Accordingly, in this embodiment, in the standby mode, the CPU 40 never performs the application.

Although the system LSI 42 is supplied with power even in the standby mode, generation of clocks to the GPU 42b, the DSP 42c and the VRAM 42d are stopped so as not to be driven, realizing reduction in power consumption.

Although illustration is omitted, inside the housing 14 of the game apparatus 12, a fan is provided for excluding heat of the IC, such as the CPU 40, the system LSI 42, etc. to outside. In the standby mode, the fan is also stopped.

However, in a case that utilizing the standby mode is not desired, by making the standby mode unusable, when the power button 20a is turned off, the power supply to all the circuit components are completely stopped.

Figure 3:
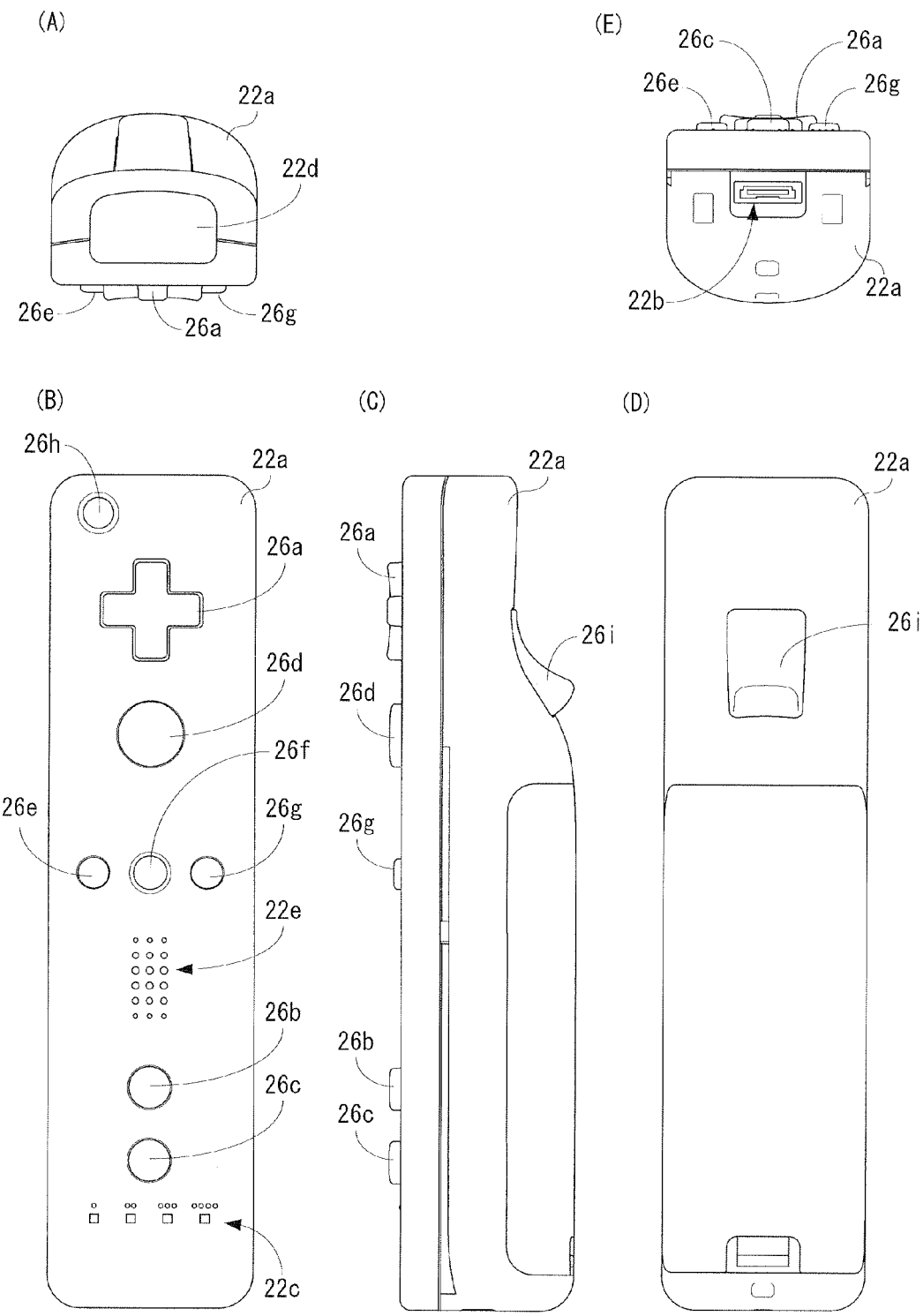
FIG. 3 shows an example non-limiting appearance of a first controller shown in FIG. 1.

Furthermore, switching between the normal mode and the standby mode can be performed by turning on and off the power switch 26h (see FIG. 3 (B)) of the first controller 22 by remote control. If the remote control is not performed, setting is made such that the power supply to the wireless controller module 52a is not performed in the standby mode.

The reset button 20b is also connected to the system LSI 42. When the reset button 20b is pushed, the system LSI 42 restarts the activation program of the game apparatus 12. The eject button 20c is connected to the disk drive 54. When the eject button 20c is pushed, the optical disk 18 is removed from the disk drive 54.

FIG. 3(A) to FIG. 3(E) show one example of an external appearance of the first controller 22. FIG. 3(A) shows a leading end surface of the first controller 22, FIG. 3(B) shows a top surface of the first controller 22, FIG. 3(C) shows a right surface of the first controller 22, FIG. 3(D) shows a bottom surface of the first controller 22, and FIG. 3(E) shows a trailing end of the first controller 22.

Referring to FIG. 3(A) to FIG. 3(E), the first controller 22 has a housing 22a formed by plastic molding, for example. The housing 22a is formed into an approximately rectangular parallelepiped shape and has a size small enough to be held by one hand of a user. The housing 22a (first controller 22) is provided with the inputter (a plurality of buttons or switches) 26. Specifically, as shown in FIG. 3(B), on a top surface of the housing 22a, there are provided a cross key 26a, a 1 button 26b, a 2 button 26c, an A button 26d, a − button 26e, a HOME button 26f, a + button 26g and a power switch 26h. Moreover, as shown in FIG. 3(C) and FIG. 3(D), an inclined surface is formed on a bottom surface of the housing 22a, and a B-trigger switch 26i is formed on the inclined surface.

The cross key 26a is a four directional push switch, including four directions of front (or upper), back (or lower), right and left operation parts. By operating any one of the operation parts, it is possible to instruct a moving direction of a character or an object (player character or player object) that is operable by a player, instruct the moving direction of a cursor, or merely instruct the direction.

The 1 button 26b and the 2 button 26c are respectively push button switches. They are used for a game operation, such as adjusting a viewpoint position and a viewpoint direction in displaying the 3D game image, i.e. a position and an image angle of a virtual camera. Alternatively, the 1 button 26b and the 2 button 26c can be used for the same operation as that of the A-button 26d and the B-trigger switch 26i or an auxiliary operation.

The A-button switch 26d is the push button switch, and is used for causing the player character or the player object to take an action other than a directional instruction, specifically arbitrary actions such as hitting (punching), throwing, grasping (acquiring), riding, and jumping, etc. For example, in an action game, it is possible to give an instruction to jump, punch, move a weapon, and so forth. Also, in a roll playing game (RPG) and a simulation RPG, it is possible to give an instruction to acquire an item, select and determine the weapon and command, and so forth. Furthermore, in a case that the first controller 22 is used as a pointing device, the A-button switch 26d is used to instruct a decision of an icon or a button image instructed by a pointer (instruction image) on the game screen. For example, when the icon or the button image is decided, an instruction or a command set in advance corresponding thereto can be input.

The − button 26e, the HOME button 26f, the + button 26g, and the power supply switch 26h are also push button switches. The − button 26e is used for selecting a game mode. The HOME button 26f is used for displaying a game menu (menu screen). The + button 26g is used for starting (resuming) or pausing the game. The power supply switch 26h is used for turning on/off a power supply of the game apparatus 12 by remote control.

In this embodiment, note that the power supply switch for turning on/off the first controller 22 itself is not provided, and the first controller 22 is set at on-state by operating any one of the switches or buttons of the inputter 26 of the first controller 22, and when not operated for a certain period of time (30 seconds, for example) or more, the first controller 22 is automatically set at off-state.

The B-trigger switch 26i is also the push button switch, and is mainly used for inputting a trigger such as shooting, and designating a position selected by the first controller 22. In a case that the B-trigger switch 26i is continued to be pushed, it is possible to make movements and parameters of the player object constant. In a fixed case, the B-trigger switch 26i functions in the same way as a normal B-button, and is used for canceling the action and the command determined by the A-button 26d.

As shown in FIG. 3(E), a connector 22b is provided on a trailing end surface of the housing 22a, and as shown in FIG. 3(B), an indicator 22c is provided on the top surface and on the side of the trailing end surface of the housing 22a. In this embodiment, the connector 22b is provided for mainly connecting the gyro unit 24. The indicator 22c is made up of four LEDs, for example. The indicator 22c can show identification information (controller number) of the first controller 22 by lighting any one of the four LEDs and according to the lighted LED, and show the remaining amount of the battery of the first controller 22 depending on the number of LEDs to be emitted.

In addition, the first controller 22 has an imaged information arithmetic section 80 (see FIG. 7), and a light incident opening 22d of the imaged information arithmetic section 80 is provided on the leading end surface of the housing 22a as shown in FIG. 3(A). Furthermore, the first controller 22 has a speaker 86 (see FIG. 7), and the speaker 86 is provided inside the housing 22a at the position corresponding to a sound release hole 22e between the 1 button 26b and the HOME button 26f on the top surface of the housing 22a as shown in FIG. 3(B).

Note that the shape of the first controller 22 and the shape, number and setting position of each inputter 26 shown in FIG. 3(A) to FIG. 3(E) are simply one example, and needless to say, even if they are suitably modified, the example embodiment can be implemented.

FIG. 4(A) shows a state that the gyro unit 24 is connected to the first controller 22 as shown in FIG. 1. The gyro unit 24 is connected to the trailing end surface of the first controller 22 (on the side of the indicator 22c). As shown in FIG. 4(B), the gyro unit 24 has a housing 24a formed by plastics molding similar to the first controller 22. The housing 24a is a substantially cubic shape, and has an attachment plug 24b to be connected to the connector 22b of the first controller 22 on the side for connection to the first controller 22. Furthermore, as shown in FIG. 4(C), on the opposite side to the side where the attachment plug 24b is provided, a connector 24c is provided. Although detailed description is omitted, when the gyro unit 24 is connected to the first controller 22, a rock mechanism maintains the connected state. The connected state is cancelled when the cancel buttons 24d provided both of the side surfaces of the gyro unit 24 are pushed. This makes it possible to detachably attach the gyro unit 24 to the first controller 22.

Figure 5:
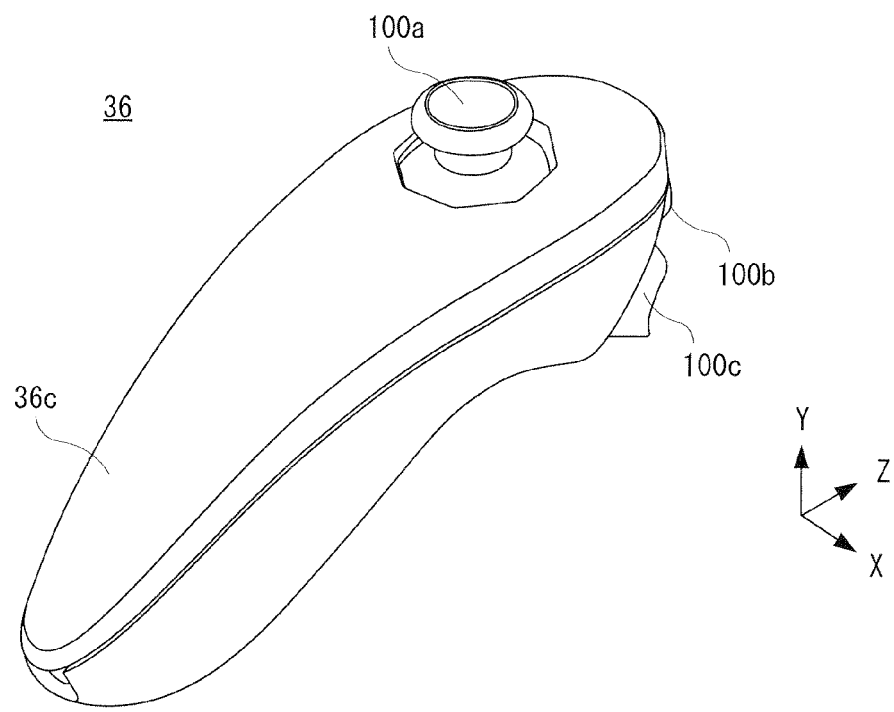
FIG. 5 shows an example non-limiting appearance of a second controller shown in FIG. 1.
Figure 5:
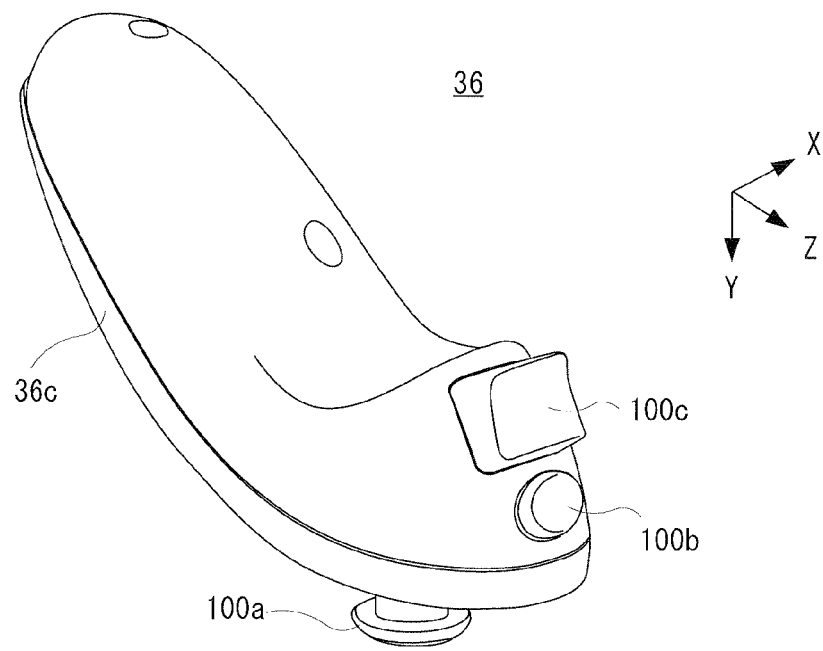

FIG. 5 shows one example of an appearance of the second controller 36. FIG. 5(A) is a perspective view of the second controller 36 as seeing it from above rear, and FIG. 5(B) is a perspective view of the second controller 36 as seeing it from below front. It should be noted that in FIG. 5, the attachment plug 36a and the cable 36b of the second controller 36 are omitted. The second controller 36 has a housing 36c formed by plastic molding, for example. As shown in FIGS. 5(A) and (B), The housing 36c is formed into an approximately thin long elliptical shape in the forward and backward directions (Z-axis direction) when viewed from plane, and has the width of the right and left direction (X-axis direction) at the rear end narrower than that of the front end. Furthermore, the housing 36c has a curved shape as a whole when viewed from a side, and downwardly curved from a horizontal portion at the front end to the rear end. The housing 36c has a size small enough to be held by one hand similar to the first controller 22, and has a longitudinal length (in the Z-axis direction) slightly shorter than that of the housing 22a of the first controller 22. As with the case of the second controller 36, the player can perform a game operation by operating buttons and a stick, and by changing a position and a direction of the controller itself.

At a front end of the top surface of the housing 36c, an analog joystick 100a is provided. At an end of the housing 36c, a front surface slightly inclined backward is provided, and on the front surface are provided a C button 100b and a Z button 100c vertically (Y-axis direction in FIG. 5) arranged. The analog joystick 100a and the respective buttons 100b and 100c are assigned appropriate functions according to a game program to be executed by the game apparatus 12. The analog joystick 100a and the respective buttons 100b and 100c provided to the second controller 36 may inclusively be denoted as an inputter 100.

Figure 6:
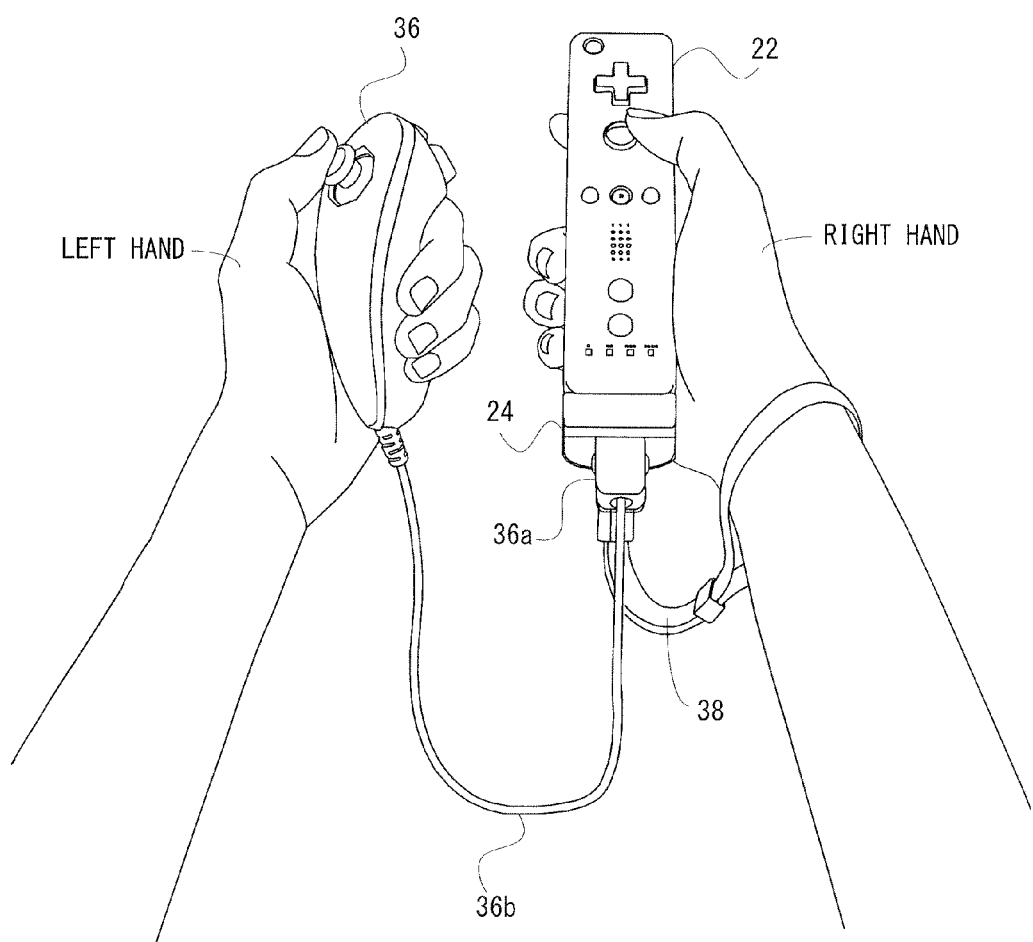
FIG. 6 shows an example non-limiting state where a player operates the controllers.

In this game system 10, a user can make an input with respect to an application like a game, or the like by moving the first controller 22 itself and the second controller 36 other than a button operation. In playing the game, for example, the player holds the first controller 22 with the right hand and the second controller 36 with the left hand as shown in FIG. 6. Although it is difficult to understand in the drawing, at the rear surface of the first controller 22, a strap 38 is attached so as to be hung on the wrist of the right hand of the player. This makes it possible to prevent the first controller 22 from being released during playing the game.

As described above, the first controller 22 contains an acceleration sensor 74 for detecting accelerations in the three-axis directions, and the second controller 36 contains a similar acceleration sensor 102. When the first controller 22 and the second controller 36 are moved by the player, acceleration values in the three-axis directions (see FIG. 4, FIG. 5) indicating the motions of the controllers themself are detected by the acceleration sensor 74 and the acceleration sensor 102. Furthermore, in this embodiment, the first controller 22 is attached with the gyro unit 24, and therefore, the angular velocity values (see FIG. 4) about the three axes indicating the motions of the first controller 22 itself are further detected.

The data corresponding to the detected values is transmitted to the game apparatus 12 being included in the aforementioned controller data. In the game apparatus 12, the controller data from the controller 14 is received by the input-output processor 64a via the antenna 52a and the wireless controller module 52, and the received controller data is written to a buffer area of the internal main memory 42e or the external main memory 46 by the input-output processor 42a. The CPU 40 reads the controller data stored in the buffer area of the internal main memory 42e or the external main memory 46, and restores the detected value, that is, the values of the acceleration and/or the angular velocity detected by the controller 14 from the controller data.

The CPU 44 may execute processing for calculating a velocity of the first controller 22 and the second controller 36 from the restored acceleration in parallel with such a restoring processing. In parallel therewith, a travel distance or a position of the first controller 22 and the second controller 36 can be evaluated from the calculated velocity. On the other hand, from the restored angular velocity, a rotation angle of the first controller 22 is evaluated.

Here, an initial value (constant of integration) when the accelerations are accumulated to calculate the velocity, and the angular velocities are accumulated to calculate the rotation angle can be calculated from the position coordinate data from the imaged information arithmetic section 80 as described above, for example. The position coordinate data can also be used for correcting the errors accumulated due to the integration.

The game processing is executed on the basis of the variables thus evaluated, such as the acceleration, the velocity, the travel distance, the angular velocity, the rotation angle, etc. Accordingly, all of the processing described above need not to be executed, and the variables necessary for the game processing may be calculated as required. It should be noted that the angular velocity and the rotation angle can also be calculated from the acceleration in principle, but this requires a complex routine for the game program, which also imposes a heavy processing load on the CPU 44. By utilizing the gyro sensor unit 24, a development of the program is made easy, and the processing load on the CPU 40 is reduced.

Figure 7:
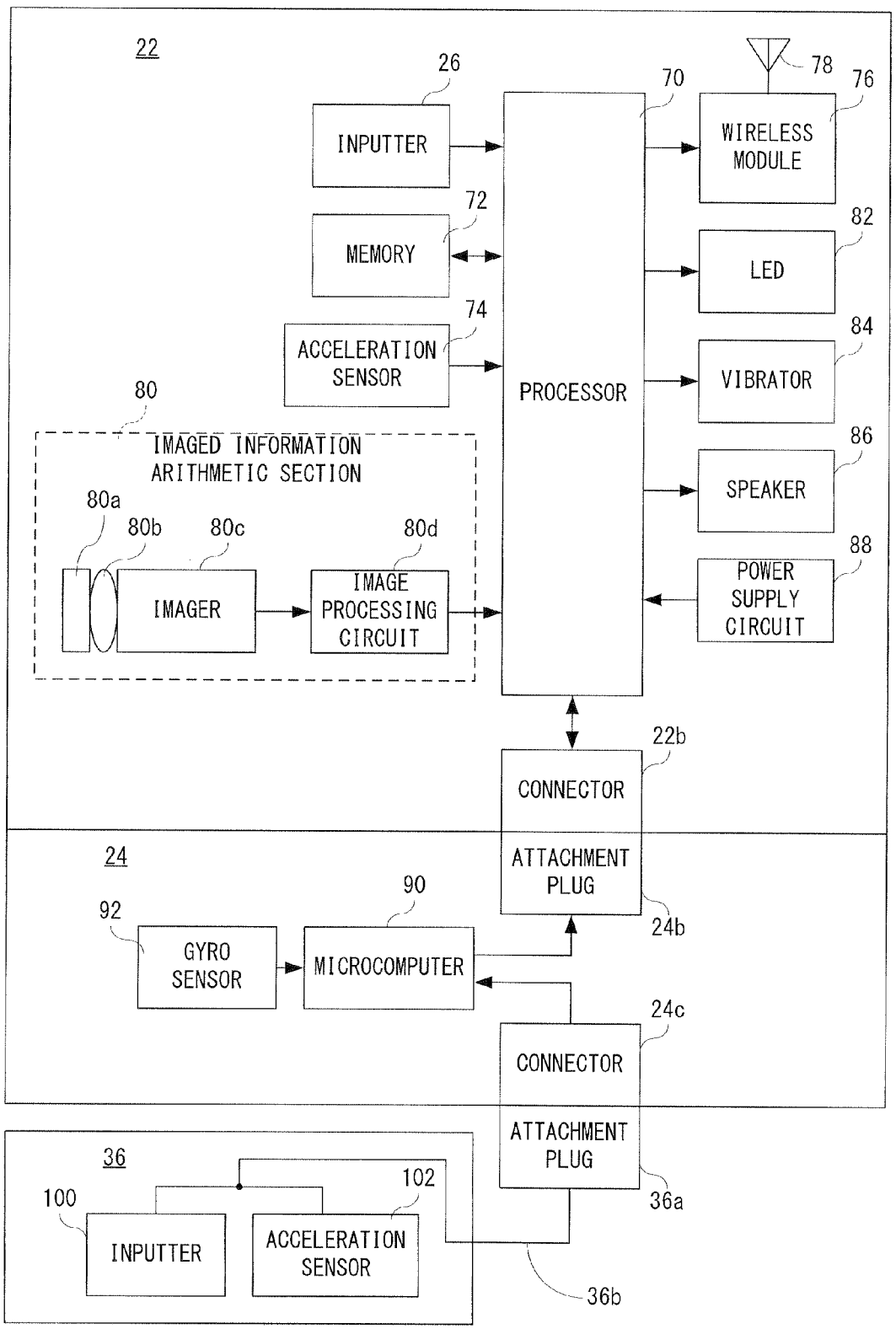
FIG. 7 shows an example non-limiting electric configuration in a state where the first controller, the gyro unit and the second controller that are shown in FIG. 1 are connected with each other.

FIG. 7 is a block diagram showing an electric configuration of the first controller 22, the gyro unit 24 and the second controller 36. Referring to FIG. 7, the first controller 22 includes a processor 70, and the processor 70 is connected with the connector 22b, the inputter 26, a memory 72, the acceleration sensor 74, a wireless module 76, the imaged information arithmetic section 80, an LED 82 (indicator 22c), a vibrator 84, the speaker 86 and a power supply circuit 88 by an internal bus (not shown). Also, the wireless module 76 is connected with an antenna 78.

Although omitted in FIG. 7 for the sake of simplicity, the indicator 22c is made up of four LEDs 82 as described above.

The processor 70 first entirely controls the first controller 22, and transmits (inputs) the information (input information) input by the inputter 26, the acceleration sensor 74 and the imaged information arithmetic section 80 as controller data to the game apparatus 12 via the wireless module 76 and the antenna 78. At this time, the processor 70 utilizes the memory 72 as a working area or a buffer area. Furthermore, the operation signal (operation data) from the above-described inputter 26 (26a-26i) is input to the processor 70, and the processor 70 temporarily stores the operation data in the memory 72.

Figure 4:
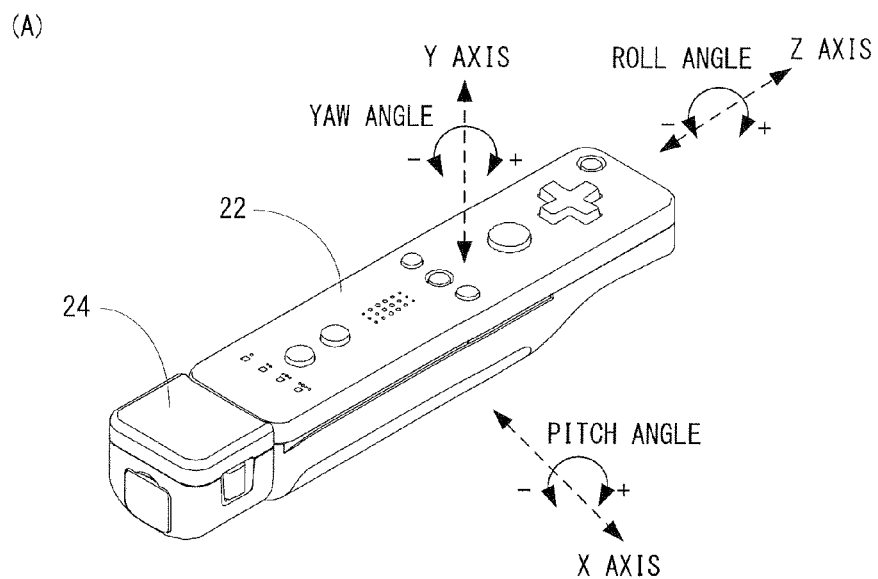
FIG. 4 shows an example non-limiting appearance of the first controller connected with a gyro unit and the gyro unit shown in FIG. 1.
Figure 4:
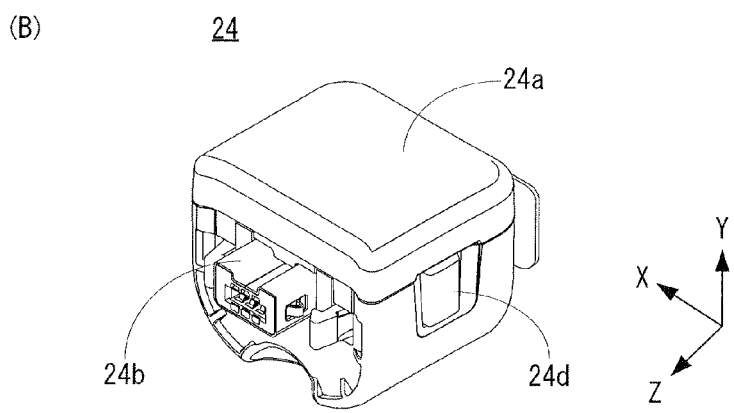
Figure 4:
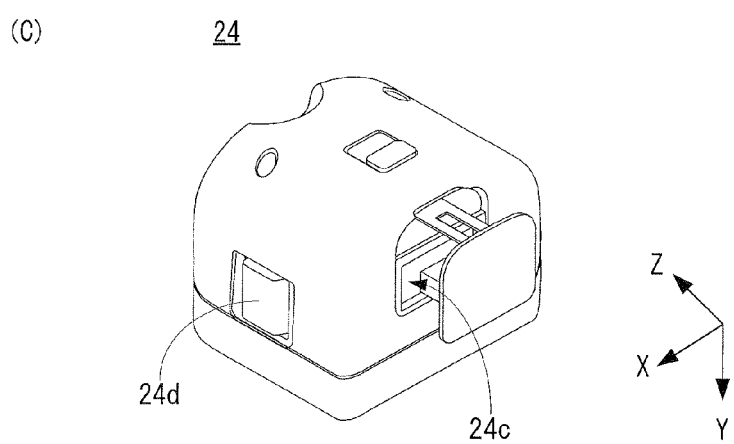

Moreover, as shown in FIG. 4, the acceleration sensor 74 detects each acceleration of the controller 22 in directions of three axes of vertical direction (Y-axial direction), lateral direction (X-axial direction), and forward and rearward directions (Z-axial direction). The acceleration sensor 74 is typically an acceleration sensor of an electrostatic capacity type, but the acceleration sensor of other types may also be used.

For example, the acceleration sensor 74 detects accelerations (ax, ay, and az) in each direction of X-axis, Y-axis, Z-axis, and inputs the data of the acceleration (acceleration data) thus detected to the processor 70. For example, the acceleration sensor 74 detects the acceleration in each direction of the axes in a range from −2.0 g to 2.0 g (g indicates a gravitational acceleration. This holds true below.) The processor 70 detects the acceleration data given from the acceleration sensor 74, and temporarily stores it in the memory 72. Accordingly, proper arithmetic process is performed on the detected accelerations to thereby calculate a tilt and a rotation of the first controller 22 and an attitude of the acceleration sensor 74 in the direction of gravity. Also, motions applied to the first controller 22 by swings, etc. can similarly be calculated.

The processor 70 creates controller data including at least operation data from the first controller 22, acceleration data from the first controller 22, marker coordinate data described later, angular velocity data described later, operation data of the second controller described later and acceleration data of the second controller described later, and transmits the created controller data to the game apparatus 12.

Although omitted in FIG. 3 (A) to FIG. 3 (E), the acceleration sensor 74 is provided inside the housing 22a on the circuit board in the vicinity of a place where the cross key 26a is arranged in this embodiment.

The wireless module 76 modulates a carrier of a predetermined frequency by the controller data by using a technique of Bluetooth, for example, and emits its weak radio wave signal from the antenna 78. Namely, the controller data is modulated to the weak radio wave signal by the wireless module 76 and transmitted from the antenna 78 (first controller 22). The weak radio wave signal thus transmitted is received by the wireless controller module 52 provided to the aforementioned game apparatus 12. The weak radio wave thus received is subjected to demodulating and decoding processing. This makes it possible for the game apparatus 12 (CPU 40) to acquire the controller data from the first controller 22. Then, the CPU 40 performs the processing of the application (game processing), following the acquired controller data and the application program (game program).

In addition, as described above, the first controller 22 is provided with the imaged information arithmetic section 80. The imaged information arithmetic section 80 is made up of an infrared rays filter 80a, a lens 80b, an imager 80c, and an image processing circuit 80d. The infrared rays filter 80a passes only infrared rays from the light incident from the front of the first controller 22. As described above, the markers 340m and 340n placed near (around) the display screen of the monitor 34 are infrared LEDs for outputting infrared lights ahead of the monitor 34. Accordingly, by providing the infrared rays filter 80a, it is possible to image the image of the markers 340*m* and 340*n* more accurately. The lens 80*b* condenses the infrared rays passing thorough the infrared rays filter 80*a* to emit them to the imager 80*c*. The imager 80*c* is a solid imager, such as a CMOS sensor and a CCD, for example, and images the infrared rays condensed by the lens 80*b*. Accordingly, the imager 80*c* images only the infrared rays passing through the infrared rays filter 80*a* to generate image data. Hereafter, the image imaged by the imager 80*c* is called an "imaged image". The image data generated by the imager 80*c* is processed by the image processing circuit 80*d*. The image processing circuit 80*d* calculates a position of an object to be imaged (markers 340*m* and 340*n*) within the imaged image, and outputs each coordinate value indicative of the position to the processor 70 as imaged data (marker coordinate data described later). It should be noted that the processing in the image processing circuit 80*d* is described later.

Furthermore, the first controller 22 is connected with the gyro unit 24. As understood from FIG. 5, the attachment plug 24*b* is connected to the connector 22*b*. The attachment plug 24*b* is connected with a microcomputer 90 with a signal line. The microcomputer 90 is connected with a gyro sensor 92, and connected with the connector 24*c* with a signal line.

The gyro sensor 92, as shown in FIG. 4, detects angular velocities about three axes of vertical direction (about a Y-axial direction), lateral direction (about a X-axial direction), and forward and rearward directions (about an Z-axial direction) of the controller 22. Here, a rotation about the Y axis is represented by a yaw angle, a rotation about the X axis is represented by a pitch angle, and a rotation about the Z axis is represented by a roll angle. The gyro sensor 92 can employ a typically piezoelectric vibration type, but may employ other types.

For example, the gyro sensor 92 detects an angular velocity ($\omega x$, $\omega y$, $\omega z$) in relation to each of the X axis, the Y axis, and the Z axis, and inputs the detected angular velocities to the microcomputer 90. Here, when the angular velocities are converted from analog signals to digital data when input to the microcomputer 90. The gyro sensor 92 used in this embodiment can measure an angular velocity relative to each axis in the range from 0 to 1500 dps (degree percent second). In the virtual game of this embodiment described later, the range from 900 to 1500 dps is a range of measure relative to the yaw angle, and the range from 0 to 1500 dps is a range of measure relative to the pitch angle and the roll angle.

Here, the sensor is a gyro sensor (angular velocity sensor) in this embodiment, but may be other motion sensors, such as an acceleration sensor, a velocity sensor, a displacement sensor, a rotation angle sensor, etc. The sensor includes a slant sensor, an image sensor, an optical sensor, a pressure sensor, a magnetic sensor, a temperature sensor, etc. other than the motion sensors, and in a case that either sensor is added, an operation by utilizing an object to be detected of the sensor is made possible. In a case that either sensor is utilized, the sensor can be added to the operating device while another device connected to the conventional operating device is utilized as it is.

The microcomputer 90 detects an angular velocity applied from the gyro sensor 92, and temporarily stores the detected angular velocity data corresponding to the angular velocity in a memory (not illustrated) included in the microcomputer 90. Then, the microcomputer 90 transmits the angular velocity data temporarily stored in the memory to the first controller 22 (processor 70). Thus, the controller data may include the angular velocity data.

Noted that in this embodiment, the microcomputer 90 temporarily stores the angular velocity data in the memory, and transmits the same in batches to a certain degree to the processor 70, but may directly transmit the angular velocity data to the processor 70 without temporarily storing the same in the memory.

Inside the housing 36*c* of the second controller 36, the acceleration sensor 102 (FIG. 7) is provided. As the acceleration sensor 102, an acceleration sensor similar to the acceleration sensor 74 of the first controller 22 is applied. More specifically, a three-axis acceleration sensor is applied in this embodiment, and detects accelerations in each of the three axis directions such as an up and down direction (Y-axial direction shown), a right and left direction (X-axial direction shown), and a forward and backward direction (Z-axial direction shown) of the second controller 36. Accordingly, similar to the case of the first controller 22, proper arithmetic processing is performed on the detected accelerations to thereby calculate a tilt and a rotation of the second controller 36 and an attitude of the acceleration sensor 102 in the direction of gravity. Furthermore, it is possible to calculate a motion applied to the second controller 36 by swinging, etc.

In addition, the power source is applied by a battery (not illustrated) which is replaceably accommodated in the first controller 22. The gyro unit 24 is supplied with the power via the connector 22*b* and the attachment plug 24*b*. Moreover, a part of the power supplied from the first controller 22 to the gyro unit 24 is applied to the second controller 36 via the connector 24*c*, the attachment plug 36*a* and the cable 36*b*.

As described above, when a game is played in the video game system 10 by utilizing the first controller 22 and the second controller 36, the player holds the first controller 22 with one hand (right hand) and holds the second controller 36 with the other hand (left hand). Here, the gyro unit 24 is attached to the first controller 22. In a case that the first controller 22 is used as a pointing device, the player holds the controller 22 in a state that the front end surface (the side of the incident light opening 22*d* of the light imaged by the imaged information arithmetic section 80) of the controller 22 is oriented to the markers 340*m* and 340*n*. It should be noted that as can be understood from FIG. 1, the markers 340*m* and 340*n* are placed in parallel with the horizontal direction of the screen of the monitor 34. In this state, the player performs a game operation by changing a position on the screen designated by the first controller 22, and changing a distance between the first controller 22 and each of the markers 340*m* and 340*n*.

Figure 8:
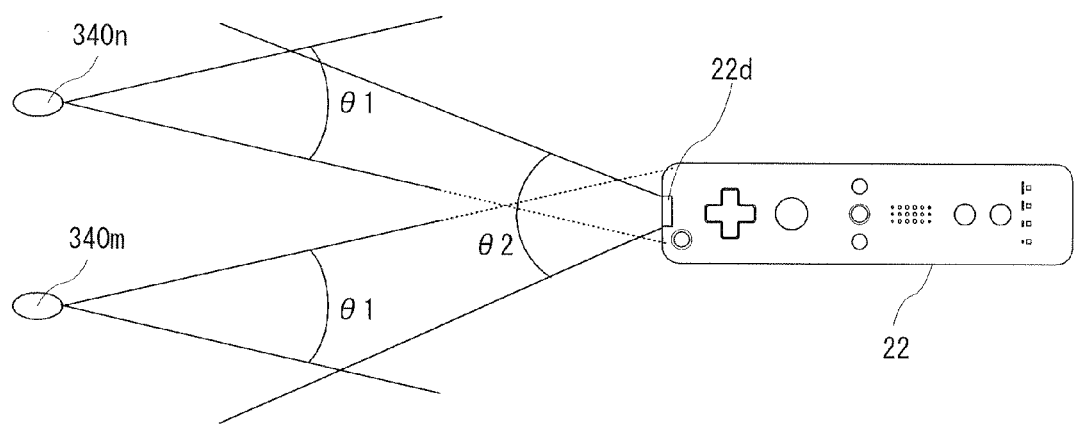
FIG. 8 shows an example non-limiting markers shown in FIG. 1 and viewing angles of the controller.

FIG. 8 is a view showing viewing angles between the respective markers 340*m* and 340*n*, and the first controller 22. For the sake of simplicity, in FIG. 8, the gyro unit 24 and the second controller 36 are omitted. As shown in FIG. 8, each of the markers 340*m* and 340*n* emits infrared ray within a range of a viewing angle $\theta 1$. Also, the imager 80*c* of the imaged information arithmetic section 80 can receive incident light within the range of the viewing angle $\theta 2$ with the line of sight of the first controller 22 as center. For example, the viewing angle $\theta 1$ of each of the markers 340*m* and 340*n* is 34° (half-value angle) while the viewing angle $\theta 2$ of the imager 80*c* is 41°. The player holds the first controller 22 such that the imager 80*c* is directed and positioned so as to receive the infrared rays from the markers 340*m* and 340*n*. More specifically, the player holds the first controller 22 such that at least one of the markers 340*m* and 340*n* exists in the viewing angle $\theta 2$ of the imager 80*c*, and the first controller 22 exists in at least one of the viewing angles $\theta 1$ of the marker 340*m* or 340*n*. In this state, the first controller 22 can detect at least one of the markers 340*m* and 340*n*. The player can perform a game operation by changing the position and the attitude of the first controller 22 in the range satisfying the state.

If the position and the attitude of the first controller 22 are out of the range, the game operation based on the position and the attitude of the first controller 22 is performed on the basis of the angular velocity detected by the gyro unit 24. Hereafter, the above-described range is called a "pointing operation allowable range".

Figure 9:
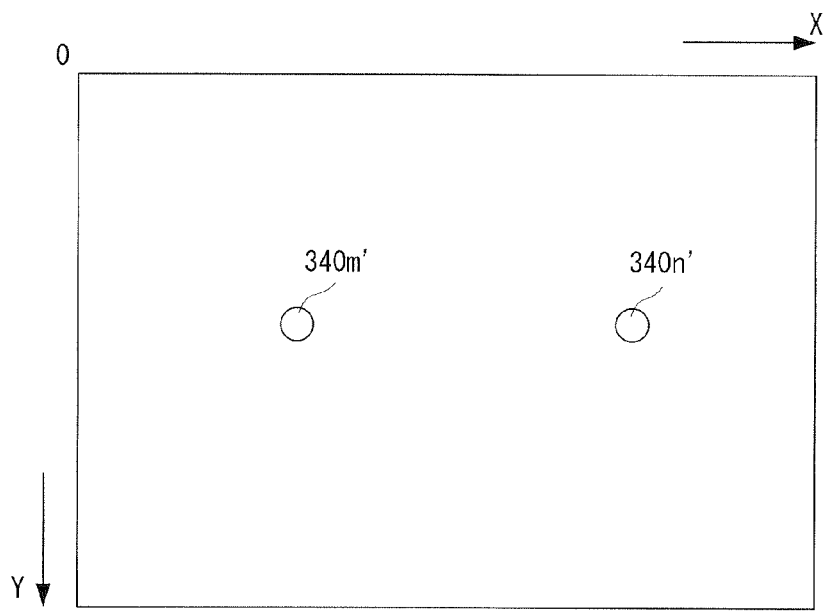
FIG. 9 shows an example non-limiting imaged images including object images.

If the controller 22 is held within the pointing operation allowable range, an image of each of the markers 340*m* and 340*n* is imaged by the imaged information arithmetic section 80. That is, the imaged image obtained by the imager 80*c* includes an image (object image) of each of the markers 340*m* and 340*n* as an object to be imaged. FIG. 9 is an illustrative view showing one example of the imaged image including the object images. The image processing circuit 80*d* calculates coordinates (marker coordinates) indicative of the position of each of the markers 340*m* and 340*n* in the imaged image by utilizing the image data of the imaged image including the object images.

Since the object image appears as a high-intensity part in the image data of the imaged image, the image processing circuit 80*d* first detects the high-intensity part as a candidate of the object image. Next, the image processing circuit 80*d* determines whether or not the high-intensity part is the object image on the basis of the size of the detected high-intensity part. The imaged image may include images other than the object image due to sunlight through a window and light of a fluorescent lamp in the room as well as the images 340*m*' and 340*n*' corresponding to the two markers 340*m* and 340*n* as an object image. The determination processing whether or not the high-intensity part is an object image is executed for discriminating the images 340*m*' and 340*n*' as an object image from the images other than them, and accurately detecting the object image. More specifically, in the determination processing, it is determined whether or not the detected high-intensity part is within the size of the preset predetermined range. Then, if the high-intensity part is within the size of the predetermined range, it is determined that the high-intensity part represents the object image. On the contrary, if the high-intensity part is not within the size of the predetermined range, it is determined that the high-intensity part represents the images other than the object image.

In addition, as to the high-intensity part which is determined to represent the object image as a result of the above-described determination processing, the image processing circuit 80*d* calculates the position of the high-intensity part. More specifically, the barycenter position of the high-intensity part is calculated. Here, the coordinates of the barycenter position is called a "marker coordinate". Also, the barycenter position can be calculated with more detailed scale than the resolution of the imager 80*c*. Now, the resolution of the imaged image imaged by the imager 80*c* shall be 126×96, and the barycenter position shall be calculated with the scale of 1024×768. That is, the marker coordinate is represented by the integer from (0, 0) to (1024, 768).

Additionally, the position in the imaged image shall be represented by a coordinate system (XY coordinate system) taking the upper left of the imaged image as an origin point, the downward direction as an Y-axis positive direction, and the right direction as an X-axis positive direction.

Also, if the object image is properly detected, two high-intensity parts are determined as object images by the determination processing, and therefore, two marker coordinates are calculated. The image processing circuit 80*d* outputs data indicative of the calculated two marker coordinates. The data of the output marker coordinates (marker coordinate data) is included in the controller data by the processor 70 as described above, and transmitted to the game apparatus 12.

The game apparatus 12 (CPU 40) detects the marker coordinate data from the received controller data to thereby calculate an designated position (designated coordinate) by the first controller 22 on the screen of the monitor 34 and a distances from the first controller 22 to each of the markers 340*m* and 340*n* on the basis of the marker coordinate data. More specifically, from the position of the mid point of the two marker coordinates, a position to which the first controller 22 faces, that is, a designated position is calculated. The distance between the object images in the imaged image is changed depending on the distance between the first controller 22 and each of the markers 340*m* and 340*n*, and therefore, the game apparatus 12 can grasp the distance between the first controller 22 and each of the markers 340*m* and 340*n* by calculating the distance between the two marker coordinates.

It should be noted that each output to the above-described processor 70 is executed every 1/200 sec., for example. Accordingly, the operation data from the inputter 26, the position coordinate data from the imaged information arithmetic section 80, the acceleration data from the acceleration sensor 74, the angular velocity data from the gyro sensor 92, the operation data from the inputter 100, and the acceleration data from the acceleration sensor 102 are once output to the processor 70 for arbitrary 1/200 sec. Furthermore, the controller data is transmitted to the game apparatus 12 every 1/200 sec., for example. The wireless controller module 52 receives the controller data transmitted from the controller 22 at predetermined cycles (1/200 sec. for example), and stores them in a buffer not shown included in the wireless controller module 52. Thereafter, the game apparatus 12 reads the controller data stored during the period by the input processor 42*a* every frame (screen updating rate: 1/60 sec.), and stores it in the operation data buffer 702*a* (see FIG. 20) under the control of the CPU 40. The CPU 40 executes game processing according to the controller data with reference to the operation data buffer 702*a*.

Figure 10:
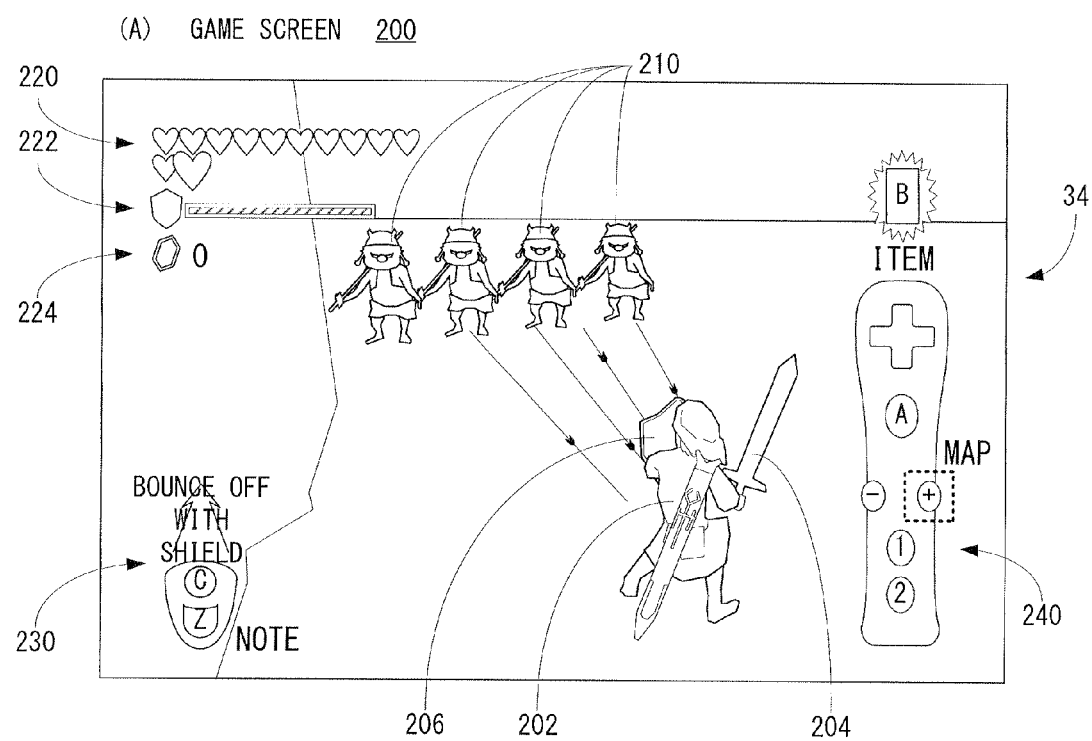
FIG. 10 shows an example non-limiting game screen to be displayed on the monitor shown in FIG. 1, and local coordinates of a sword object and a shield object.
Figure 10:
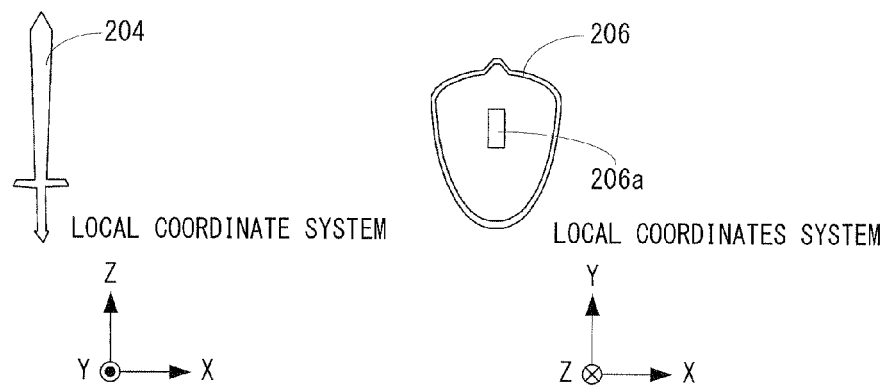
Figure 13:
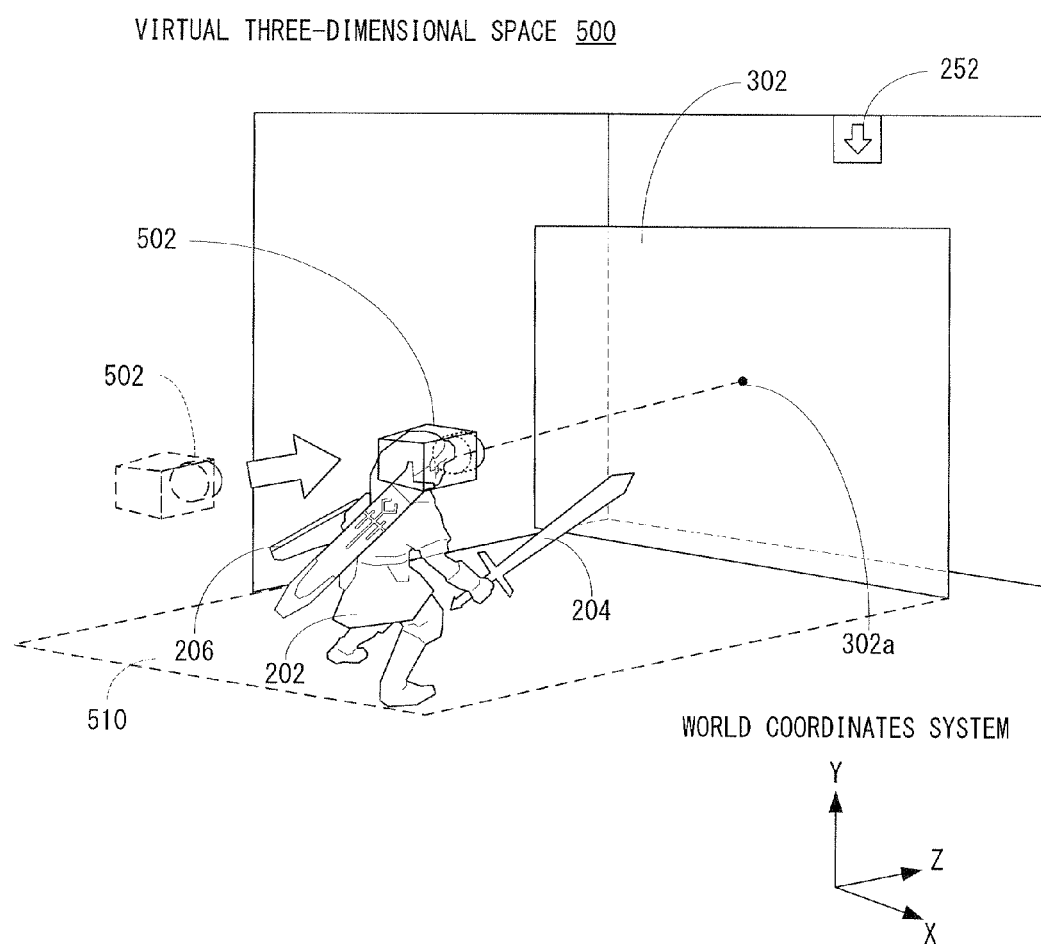
FIG. 13 shows a third example non-limiting method of setting a virtual camera in a virtual three-dimensional space.

In the game system 10 as described above, it is possible to play a virtual game. FIG. 10(A) shows an example non-limiting game screen 200 to be displayed on the monitor 34 in the virtual game of this embodiment. Although detailed description is omitted, a background object, such as a ground object, a building object and a terrain object is provided, and a player object 202 is arranged within the virtual game space (virtual three-dimensional space) 500 (see FIG. 13). Furthermore, an item object (hereinafter, simply referred to as "item") and enemy objects 210, etc. are arranged in the virtual three-dimensional space 500 as necessary. An image imaging this virtual three-dimensional space 500 with a virtual camera 502 (see FIG. 13) is displayed on the monitor 34 as a game screen. This holds true for a case that screens are displayed below.

As shown in FIG. 10(A), on the game screen 200, the player object 202 is displayed toward the bottom right of the screen from the center thereof. The player object 202 of this embodiment has a sword object 204 with the right hand and a shield object 206 with the left hand. Furthermore, on the game screen 200, a plurality of enemy objects 210 (four objects, here) are horizontally aligned toward the top of the screen from the center thereof. On the game screen 200, a state in which the enemy objects 210 release arrow objects, and the player object 202 protects from it with the shield object 206 is displayed.

Although it is difficult to understand in the drawings, a place where the player object 202 and the enemy objects 210 exist are displayed as a background.

In addition, at the upper left of the game screen 200, an image (heart image) 220 representing the life of the player object 202, an image 222 representing a defensive power of the shield object 206 and an image indicating the number of possessing predetermined items 224 are displayed. Furthermore, at the bottom left of the game screen 200, an image 230 indicating an operation method of the second controller 36 is displayed. Then, at the right end of the game screen 200, an image 240 (method instructing image) indicating an operation method of the first controller 22 is displayed.

Simply speaking, when the + button 26g of the first controller 22 is operated, a map (game map) is displayed on the monitor 34. Furthermore, when the B trigger switch 26i of the first controller 22 is operated, an item selecting and using screen is displayed on the monitor 34.

Additionally, although not displayed on the game screen 200, the first controller 22 connected with the gyro unit 24 corresponds to the sword object 204 that the player object 202 holds, and when the first controller 22 is swung, the sword object 204 also moves in accordance with the movement. This makes it possible to cut the enemy object 210 and other objects (not illustrated). Although detailed description is omitted, it is also possible to make an action other than cutting the enemy object 210 and other objects by using the sword object 204.

On the other hand, the second controller 36 corresponds to the shield object 206 held by the player object 202, and when the second controller 36 is kept still with the C button 100b turned on, the shield object 206 is made still at the position and the direction.

As shown in FIG. 10(B), to each of the sword object 204 and the shield object 206, local coordinates is provided. The local coordinates of the sword object 204 corresponds to the coordinates set to the first controller 22, and the local coordinates of the shield object 206 corresponds to the coordinates set to the second controller 36. Here, in this embodiment, axes (X axis, Y axis, Z axis) of the local coordinates set to the sword object 204 are respectively coincident with axes (X axis, Y axis, Z axis) set to the first controller 22. Similarly, axes of the local coordinates set to the shield object 206 are respectively coincident with the axes set to the second controller 36.

Accordingly, as shown in FIG. 6, in a case that the player plays the virtual game holding the first controller 22 connected with the gyro unit 24 and the second controller 36, the attitude (position and orientation) and the movement of the first controller 22 are reflected (operatively associated with) on the orientation and the movement of the sword object 204 held by the player object 202 in the virtual three-dimensional space 500. Similarly, the attitude (position and orientation) and the movement of the second controller 36 are operatively associated with the orientation and the movement of the shield object 206 held by the player object 202 within the virtual three-dimensional space 500.

Here, a movement of the sword object 204 in operatively associated with first controller 22 connected with the gyro unit 24 is not an essential content of the example embodiment, and thus, the detailed description is omitted. For example, it is possible to use the technique disclosed in the Japanese Patent Application Laying-Open No. 2010-142561 which is filed earlier by the applicant of the example embodiment and has already been laid-opened.

In addition, with respect to the second controller 36, the C button 100b is operated to thereby make the player object 202 perform an action of bouncing off an arrow with the shield object 206. Accordingly, it is possible to bounce off the arrow released by the enemy object 210 with the shield object 206. Alternatively, the Z button 100c is operated to thereby make the player object 202 note the enemy object 210. For example, if the player object 202 is caused to note the enemy object 210, the player object 202 never loses sight of the enemy object 210 during fighting.

Here, although not displayed on the game screen 200, it is possible to cut the enemy object 210 and other objects by swinging the second controller 36 as well. Although detailed description is omitted, how to cut (cut technique) is different between a case that the first controller 22 is swung and a case that the second controller 36 is swung.

In this virtual game, according to an operation by the player, the player object 202 is made to move and perform a predetermined motion, such as a swinging motion of the sword object 204, a protecting motion with the shield object 206, etc. This allows the player object 202 to fight with the enemy object 210, defeat the enemy object 210, acquire an item, go to a predetermined place to thereby clear the stages prepared in advance, and clear the game when the final purpose is attained. However, when the player object 202 is defeated by the enemy object 210, the game is over.

Figure 11:
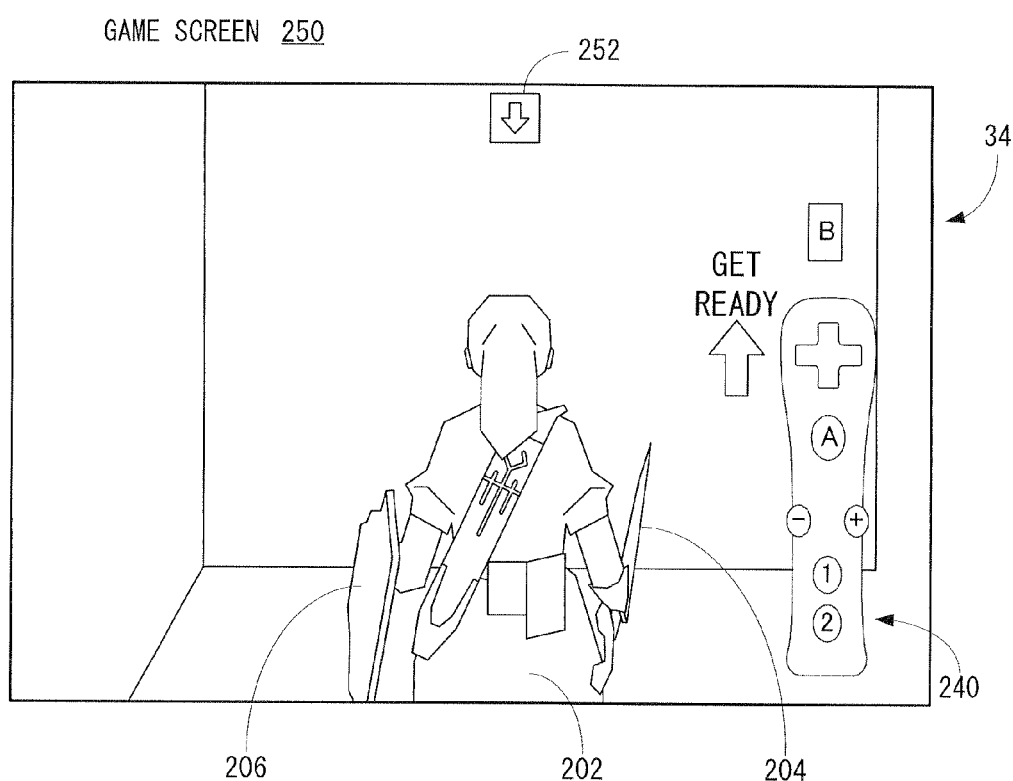
FIG. 11 shows an example non-limiting game screen to be displayed on the monitor shown in FIG. 1.

For example, when the player tilts the lever of the analog joystick 100a of the second controller 36, the player object 202 moves within the virtual three-dimensional space 500 in a tilted direction at a velocity corresponding to the amount (angle) of the tilt. FIG. 11 shows a game screen 250 when the player object 202 exists in a certain place (position) or area (depiction area in this embodiment) 510 (see FIG. 13). The range of the depiction area 510 is set in advance in order to judge whether or not the player object 202 exists in the depiction area 510.

On the game screen 250 shown in FIG. 11, the player object 202 is displayed at the bottom of the center of the screen, and the player object 202 holds the sword object 204 and the shield object 206 as described above. Furthermore, at the top of the center of the game screen 250, a designation image 252 indicating that the place where the player object 202 currently exists is a depiction area is displayed as a background. In this embodiment, a down arrow is displayed as a designation image 252, but there is no need of being restricted thereto, and other designs or symbols may be displayed. In addition, at the right end of the game screen 250, the above-described method instructing image 240 is displayed. The method instructing image 240 shows that the first controller 22 is vertically oriented such that the leading end of the first controller 22 faces upward to thereby make the player object 202 get ready.

Figure 12:
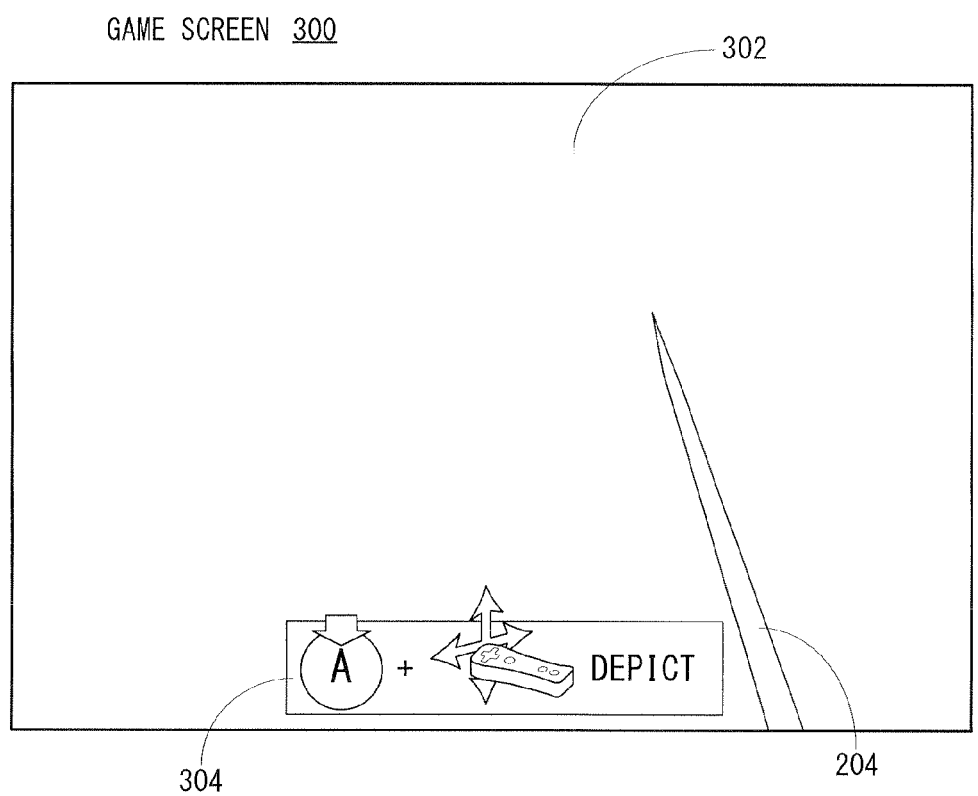
FIG. 12 shows a second example non-limiting game screen to be displayed on the monitor shown in FIG. 1.

For example, in a case that the game screen 250 shown in FIG. 11 is displayed on the monitor 34, when a predetermined condition is satisfied, a game screen 300 shown in FIG. 12 is displayed on the monitor 34. Here, the predetermined condition means that the player operates a predetermined key or switch or button, that the player object 202 uses a predetermined item, that the player object 202 hits a predetermined wall surface with the sword object 204, or that the player object 202 performs a predetermined action. These are matters to be properly set by game programs or developers, and an arbitrary condition is settable.

As shown in FIG. 12, a two-dimensional depicting screen (two-dimensional surface) 302 is displayed on the entire display region of the game screen 300. The two-dimensional surface 302 is a virtual surface (depicting surface) for allowing the player or the player object 202 to depict a two-dimensional image or drawing (hereinafter, referred to as "two-dimensional image"). Furthermore, an image (operation instructing image) 304 for designating an operation method when the two-dimensional image is depicted is displayed at the bottom of the center of the game screen 300 in front of the two-dimensional surface 302. In this operation instructing image 304, when the A button 206d is pushed with the controller 22 moving left, right, top and bottom (including oblique), it is shown to be able to depict a two-dimensional image. Furthermore, a part of the sword object 204 which the player object 202 holds is displayed in front of the two-dimensional surface 302.

In a case that the game screen 250 shown in FIG. 11 is thus displayed on the monitor 34, when a predetermined operation of facing the leading end of the first controller 22 upward and then facing forward is performed, the game screen 300 shown in FIG. 12 is displayed on the monitor 34, which makes the two-dimensional image depictable.

Here, the predetermined operation need not be restricted to the aforementioned operation, and any one or two or more of the inputter 26 of the first controller 22 may be operated. Alternatively, the second controller 36 may be operated.

Furthermore, when the player object 202 reaches the depiction area 510 without making a predetermined operation, the game screen 300 shown in FIG. 12 may be displayed on the monitor 34.

Here, a situation of the virtual three-dimensional space 500 in a case that the game screen 300 shown in FIG. 12 is displayed is described. As described above, when the predetermined operation is performed, the virtual camera 502 moves to the position of the head of the player object 202 in the virtual three-dimensional space 500. Accordingly, the game screen 300 viewed from a subjective viewpoint of the player object 202 is displayed on the monitor 34 as shown in FIG. 12.

Although detailed description is omitted, as understood from the game screen 200 shown in FIG. 10(A) and the game screen 250 shown in FIG. 11, the virtual camera 502 is generally arranged behind the player object 202, and follows the player object 202. That is, in general, a game screen (200, 250, etc.) when the player object 202 is viewed from the objective viewpoint is displayed on the monitor 34.

Figure 14:
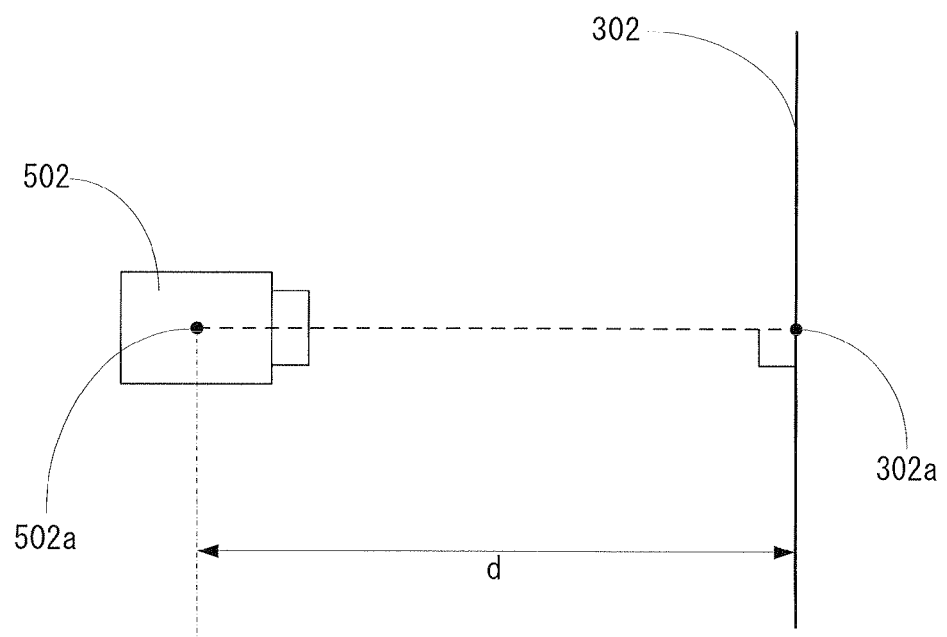
FIG. 14 shows an example non-limiting positional relationship between the virtual camera shown in FIG. 13 and a two-dimensional surface set to the virtual three-dimensional space.
Figure 14:
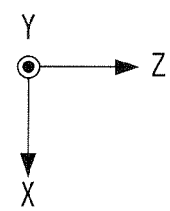

Furthermore, when the virtual camera 502 moves to the position of the head of the player object 202, a two-dimensional surface 302 is generated (arranged) in the virtual three-dimensional space 500. In this embodiment, the two-dimensional surface 302 is arranged little in front of the wall surface on which the designation image 252 is displayed. Here, as shown in FIG. 14, the two-dimensional surface 302 is arranged to face the virtual camera 502 and to have a distance between the position of the two-dimensional surface 302 and the position of the virtual camera 502 of a predetermined distance d. In this embodiment, the two-dimensional surface 302 of a predetermined size is arranged so as to face the virtual camera 502, and have the distance between the position of the center 302a of the two-dimensional surface 302 and the position (camera location) of the center (viewpoint) 502a of the virtual camera 502 of the predetermined distance d.

Here, in this embodiment, when the predetermined operation is performed, the two-dimensional surface 302 is arranged while the virtual camera 502 is moved to the position of the head of the player object 202, whereby the game screen 300 shown in FIG. 12 is displayed on the monitor 34, but there is no need of being restricted thereto. For example, when the predetermined operation is performed, the two-dimensional surface 302 is arranged, and then, the virtual camera 502 is moved to the position of the head of the player object 202 when depicting the two-dimensional image is started, that is, when the A button 26d is pushed, whereby the game screen 300 shown in FIG. 12 is displayed on the monitor 34.

Returning to FIG. 12, as described above, when the player moves the first controller 22 up, down, left and right, the sword object 204 is moved in accordance with the movement of the first controller 22. When the A button 26d is pushed here, a two-dimensional dot is sequentially (in order) depicted at the position designated by the tip of the sword object 204 on the two-dimensional surface 302. That is, a line (two-dimensional image) is depicted. In this embodiment, the dot is depicted at a point (intersection point) where the line extending from the viewpoint 502a and the two-dimensional surface 302 cross with each other. To explain specifically, a dot 304 is depicted at the intersection point between a line 520 passing through the viewpoint 502a of the virtual camera 502 and the tip point 204a of the sword object 204, and the two-dimensional surface 302 as shown in FIG. 15.

Figure 15:
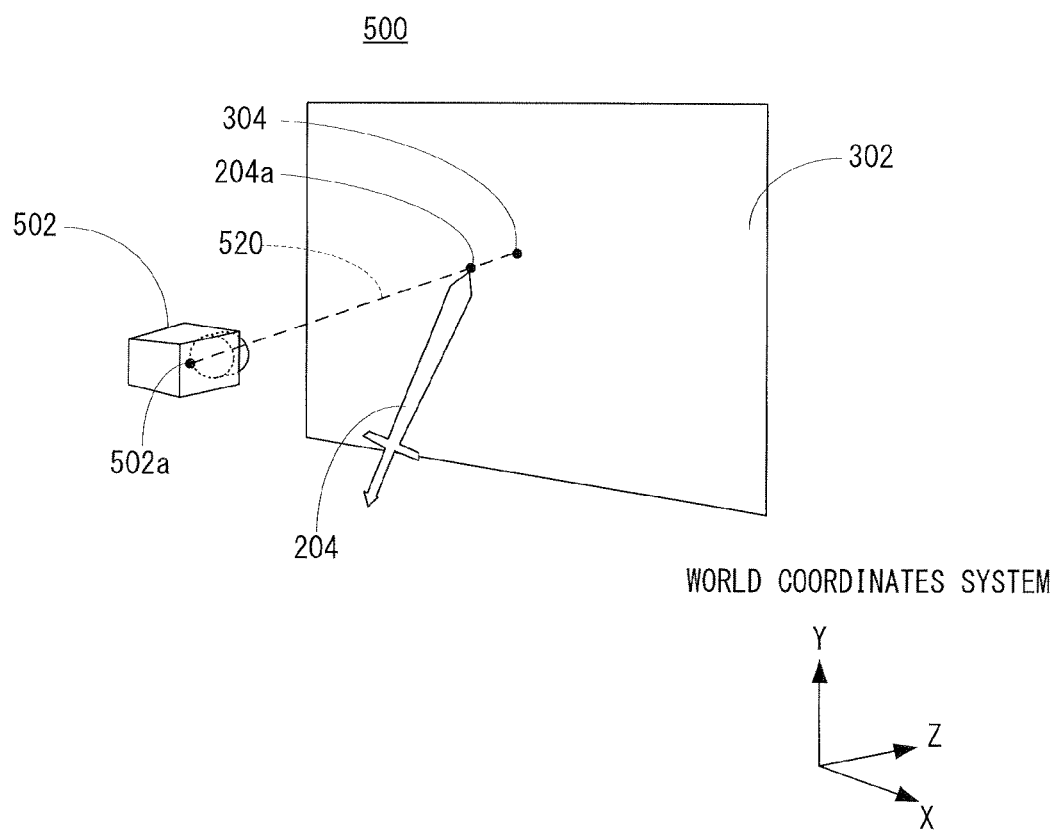
FIG. 15 shows an example non-limiting method of depicting a two-dimensional image with the sword object on the two-dimensional surface set to the virtual three-dimensional space.

Here, for the sake of simplicity, in FIG. 15, the player object 202 and the background object are omitted.

Furthermore, in this embodiment, when the two-dimensional image is depicted, the hand (the base of the sword) of the sword object 204 is fixed, and thus, the tip of the sword object 204 moves along the spherical surface in accordance with the movement of the first controller 22. Thus, when the dot 304 is depicted at the position designated by the tip of the sword, the dot 304 is depicted along the spherical surface (curved surface). Accordingly, in this embodiment, the dot 304 is depicted such that the tip of the sword is projected on the two-dimensional surface 302. Thus, in a case that the player object 202 within the virtual three-dimensional space 500 performs depiction by using an item such as the sword object 204, etc., it can perform depiction not on the spherical surface (curved surface) but on the plane surface.

Figure 16:
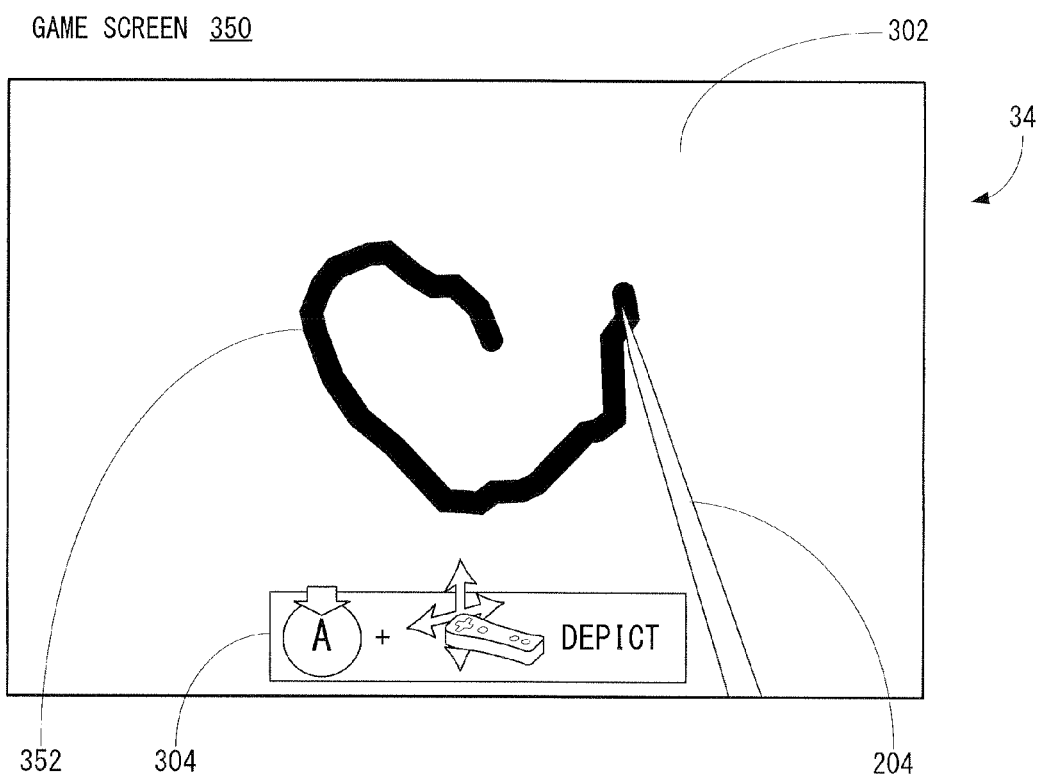
FIG. 16 shows a fourth example non-limiting game screen to be displayed on the monitor shown in FIG. 1.

FIG. 16 shows a game screen 350 in which the player or the player object 202 is depicting the two-dimensional image 352. The game screen 350 shown in FIG. 16 is the same as the game screen 300 shown in FIG. 12 except that a two-dimensional image 352 which is being depicted is displayed on the two-dimensional surface 302, and therefore, redundant explanation is omitted.

Then, when the player releases the A button 26d, depicting the two-dimensional image 352 is ended. Then, although illustration is omitted, the virtual camera 502 is returned to the original position. That is, the virtual camera 502 is moved to behind the player object 202 as shown by dotted lines in FIG. 13. Accordingly, as shown in FIG. 17, a game screen 400 when the player object 202 is viewed from the objective viewpoint is displayed on the monitor 34.

On the game screen 400, in addition to the player object 202, the sword object 204, the shield object 206 and the designation image 252, the two-dimensional surface 302 set to the virtual three-dimensional space 500 and the two-dimensional image 352 depicted on the two-dimensional surface 302 are displayed.

Also, when depicting the two-dimensional image 352 is ended, recognition processing of the depicted two-dimensional image 352 is started. In this embodiment, in a case that the two-dimensional image 352 depicted by the player or the player object 202 is recognized as a predetermined image, a three-dimensional object corresponding to the recognized predetermined image appears. For example, the predetermined image is an heart image and a circle (round) image. In correspondence with the heart image, a three-dimensional object of the heart is set (prepared), and in correspondence with the circle image, a three-dimensional object of the bomb is set. Thus, when the heart image is recognized, the corresponding three-dimensional object of the heart appears. Furthermore, when the circle image is recognized, the corresponding three-dimensional object of the bomb appears.

Figure 17:
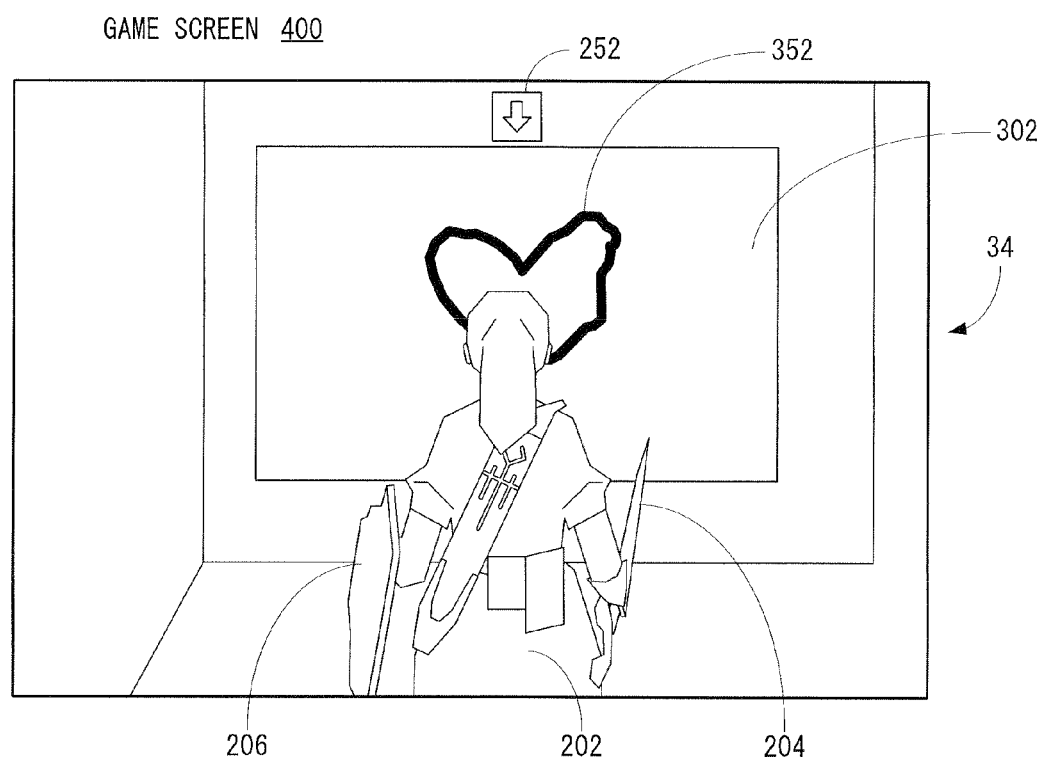
FIG. 17 shows a fifth example non-limiting game screen to be displayed on the monitor shown in FIG. 1.
Figure 18:
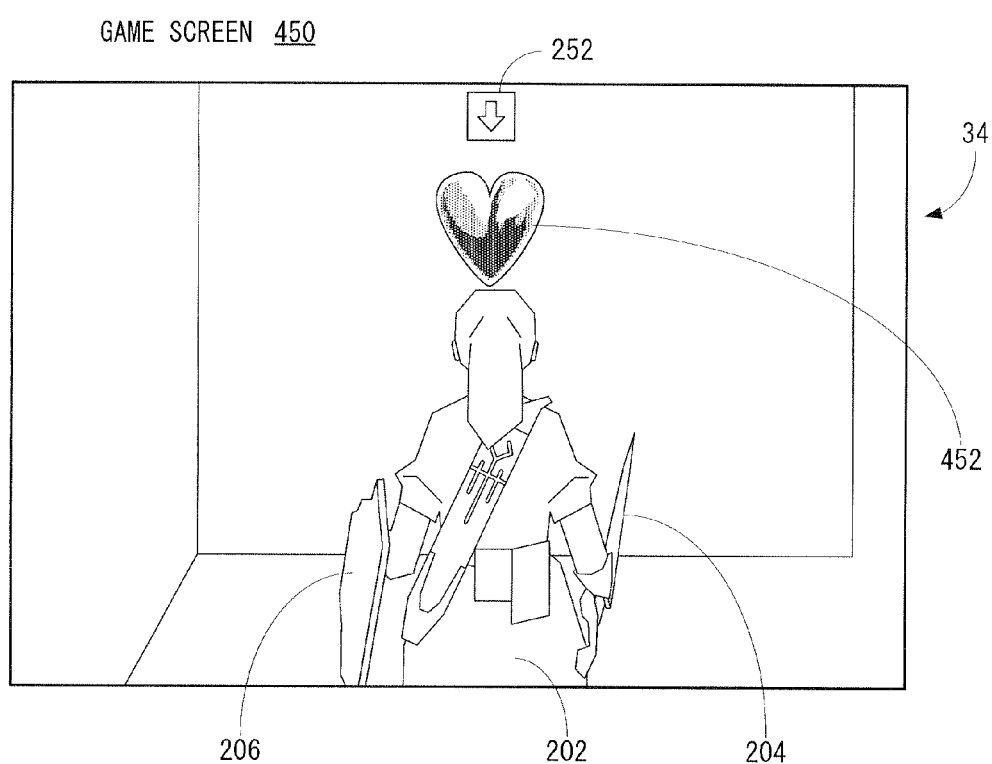
FIG. 18 shows a sixth example non-limiting game screen to be displayed on the monitor shown in FIG. 1.

Accordingly, when the two-dimensional image 352 displayed on the game screen 400 in FIG. 17 is recognized as a heart image, a game screen 450 shown in FIG. 18 is displayed on the monitor 34. On the game screen 450 shown in FIG. 18, in place of the two-dimensional surface 302 and the two-dimensional image 352, a three-dimensional object of the heart 452 is displayed. Although illustration is omitted, in the virtual three-dimensional space 500, the three-dimensional object of the heart 452 appears, and the two-dimensional surface 302 and the two-dimensional image 352 disappear. Although illustration is omitted, the three-dimensional object of the heart 452 appears, and falls to the ground, and thus, the game screen representing the situation is displayed. Thereafter, the player object 202 can obtain the three-dimensional object of the heart 452. For example, when the player object 202 obtains the three-dimensional object of the heart 452, the life of the player object 202 is increased.

Although illustration is omitted, when the circle image is recognized, the three-dimensional object of the bomb (bomb object) appears, and the player object 202 obtains it, the bomb object is added to the possessed item, or the number of possessing bomb objects is increased.

Figure 19:
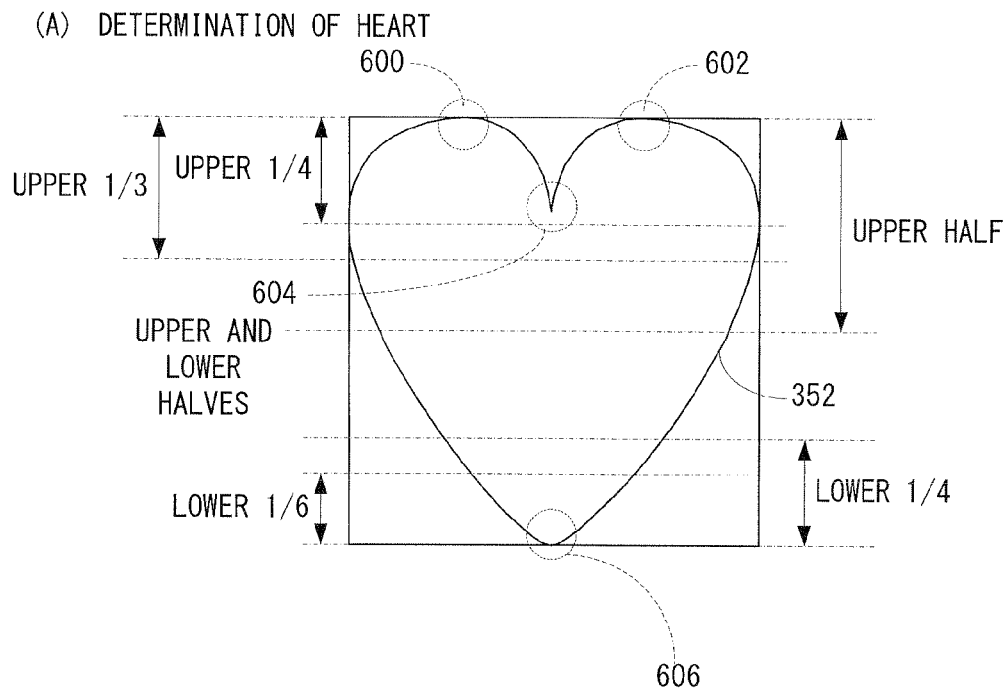
FIG. 19 shows an example non-limiting method of recognizing a two-dimensional image depicted on the two-dimensional surface set to the virtual three-dimensional space.
Figure 19:
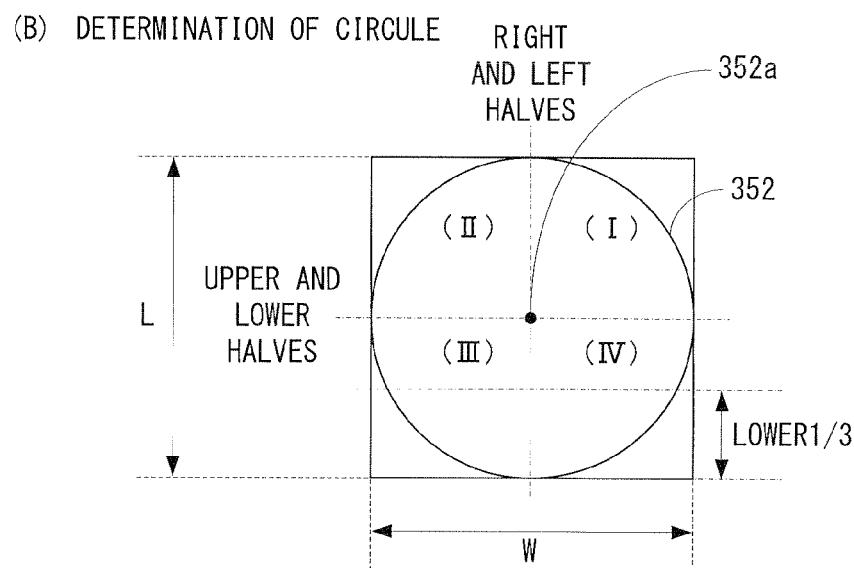

Here, a method of recognizing (determining) whether or not the depicted two-dimensional image 352 is a predetermined image is explained. Referring to FIG. 19(A), a case that whether the depicted two-dimensional image 352 is the heart image is determined is explained. In this embodiment, a score as to each item described below is calculated, and the sum of the scores is calculated.

It should be noted that in FIG. 19(A), a well-shaped two-dimensional image 352 is depicted, but as shown in FIG. 16 and FIG. 17, the two-dimensional image 352 which is out of shape to some extent is actually depicted since the two-dimensional image 352 is depicted by moving the first controller 22 in the real space. This holds true for the circle image shown in FIG. 19(B).

Here, a "corner" described below means a portion where two line segments are connected in a case that the angle formed between the connected two line segments is equal to or less than a predetermined angle (140°, for example), and each of the two line segment is equal to or more than a predetermined length. For example, each of the parts 600, 602, 604, 606 represented by dotted line circles corresponds to the "corner". Furthermore, although detailed explanation is omitted, when the depicted two-dimensional image 352 is recognized, all of the dots are not used, but dots extracted every predetermined interval in chronological order are used. This is because that use of all the dots making up of the two-dimensional image 352 needs heavy load of recognizing the shape (drawing). This holds true for recognition of the circle image.

Also, a "downward V shape" is a shape (valley shape) in which two line segments are connected with each other at the bottom out of the corners, and means a portion where the two line segments are connected with each other. In FIG. 19(A), the part 604 and the part 606 are applicable. An "upward V shape" is a shape (mountain shape) in which two line segments are connected with each other at the top, and means a portion where the two line segments are connected with each other. In FIG. 19(A), the part 600 and the part 602 are applicable.

It should be noted that as shown in FIG. 19(A) (this holds true for FIG. 19(B)), by surrounding the depicted two-dimensional image 352 by a quadrangle formed of a line passing through the uppermost point, the lowermost point, the left end point and the right end point, positions and ranges of corners, etc., are judge, from which a score is decided.

(1) There are one corner, or one or more downward V shapes within the range of the lower ¼ of the quadrangle.

(2) There are two or more corners within the upper ½ (half) of the quadrangle.

(3) The center of gravity of the corners is within the upper half ½ (half) of the quadrangle.

(4) The center of gravity of the corners is between the upper ¼ and the upper ½ (half) of the quadrangle.

(5) There is one corner within the range of the lower ⅙. Or, there is one corner within the range of the lower ½ (half).

(6) There is one downward V shape within the range of the lower ¼.

(7) There is one downward V shape within the range of the upper ½ (half).

(8) There are two upward V shapes within the range of the upper ⅓.

(9) There is one upward V shape within the range of the upper ⅓.

With respect to each of the conditions (1) to (3), the score is decided depending on whether or not each of these conditions is satisfied. If the condition (1) is satisfied, the score is 10 points, and if not satisfied, the score is 0 point. This holds true for the condition (2) and the condition (3). It should be noted that if all the conditions (1) to (3) are satisfied, 20 points are added to the total score.

With respect to the condition (4), the score is set from 0 point to 40 points. As the center of gravity of the corners is closer to the positions at ¼ from the top, the score is set to be high, and as the center of gravity of the corners is closer to the positions at ½ from the top, the score is set to be low. The sore may be changed linearly or step by step. Furthermore, as the center of gravity of the corners is closer to the positions at ¼ from the top, the score may be changed to be more increased like a parabola shape (power). If the center of gravity of the corners is out of the range defined by the condition (4), the score is 0 point. These hold true for the condition (5).

Also, with respect to the condition (5), the score is set from 0 point to 30 points. If there is one corner within the range of the lower ⅙, 30 points are earned, and as the position is heightened, the score is made small. However, if there are a plurality of corners within the range of the lower ⅙, the score is 0 point. Or, as the number of corners is increased, the score may be set to be low.

If the condition (6) is satisfied, the score is 20 points, and if not satisfied, the score is 0 point. If the condition (7) is satisfied, the score is 20 points, and if not satisfied, the score is 0 point. Here, if both of the condition (6) and the condition (7) are satisfied, 50 points are added to the total score.

If condition (8) is satisfied, the score is 20 points, and if not satisfied, the score is 0 point. If the condition (9) is satisfied, the score is 10 points, and if not satisfied, the score is 0 point. Here, if the upward V shape is within the range of the lower ½ (half), the number of upward V shapes ×30 points are subtracted from the total score.

The sum of the scores calculated as to each of the condition is obtained, and if the obtained total score is above a predetermined score, the heart image is determined. For example, the maximum total scores when the aforementioned conditions (1) to (9) are satisfied is 230 points, and when the total score is above 100 points, the heart image is determined.

Here, a method of recognizing (determining) the heart image is explained, but by utilizing a similar method, other images which is as complex as the heart image, such as, triangle, parallelogram, rhombus, star shape, spades, etc., for example, can be recognized. However, depending on the images (design) to be recognized, the feature is different, and therefore, the aforementioned conditions, such as the number of corners, the orientation of the corner, and the position or the range of the corner included in the two-dimensional image 352 are different.

Furthermore, referring to FIG. 19(B), a method of recognizing (determining) whether the depicted two-dimensional image 352 is the circle image (round) is explained. In this method, whether or not each condition shown below is satisfied, and if all the conditions ((a) to (f)) are satisfied, the depicted two-dimensional image 352 is recognized (determined) as the circle image.

(a) The number of dots in each of the ranges (area (I), (II), (III), (IV)) is equal to or more than 3 when the quadrangle is equally divided (into 4). This means the number of dots extracted from the depicted two-dimensional image 352.

(b) The horizontal to vertical ratio is between 2:3 and 3:2. Here, the vertical length L is decided based on the uppermost dot and the lowermost dot out of the dots extracted from the two-dimensional image 352. Also, the horizontal length W is decided based on the left end dot and the right end dot out of the dots extracted from the two-dimensional image 352.

(c) There are five or less corners in total. Here, determination about whether or not the "corner" is based on the aforementioned manner.

(d) There is a corner only starting write of the line (two-dimensional image 352), that is, the former ⅓ of the line, or only ending write of the line, that is, the latter ⅓ of the line.

(e) The distance between the starting point and the endpoint is within ½ of the vertical length L and within ⅓ of the horizontal length W.

(f) The center of gravity of all the dots is positioned higher than the range of the lower ⅓.

Here, the method of recognizing (determining) the circle image is explained, but by utilizing the similar method, other images being upper and lower symmetry and symmetry similar to the circle image, such as, rectangle, rhombus, shape of an ellipse, regular polygon, etc. are also recognizable. However, depending on the images (design) to be recognized, the feature is different, and therefore, the aforementioned conditions, such as the number of dots extracted from the two-dimensional image 352 included in each area, a horizontal to vertical ratio of the two-dimensional image 352, the number of corners included in the two-dimensional image 352 are different.

Additionally, in a case that the depicted two-dimensional image 352 cannot be recognized as a predetermined image, no three-dimensional object appears. Here, a three-dimensional object showing that depicting or recognizing fails, such as a mere stone object may appear.

In addition, in a case that the number of dots extracted from the depicted two-dimensional image 352 is equal to or less than 10, the depicted two-dimensional image 352 is erased to start depicting again without causing the player to execute the depicting recognition processing.

In addition, the aforementioned image recognition (determination) method is one example, and other recognition methods may be adopted. For example, a method disclosed in a Japanese Patent Application Laying-Open No. 2006-204344 filed earlier by the applicant of the application and has already been laid-open can be adopted.

Furthermore, in this embodiment, a description is made on a case that the two-dimensional image is a predetermined design, but there is no need of being restricted to the design, and this may be a symbol such as characters, etc. In such a case also, depending on the kind of the symbols, by suitably using any one of the aforementioned recognition (determination) methods, the depicted two-dimensional image can be recognized.

Figure 20:
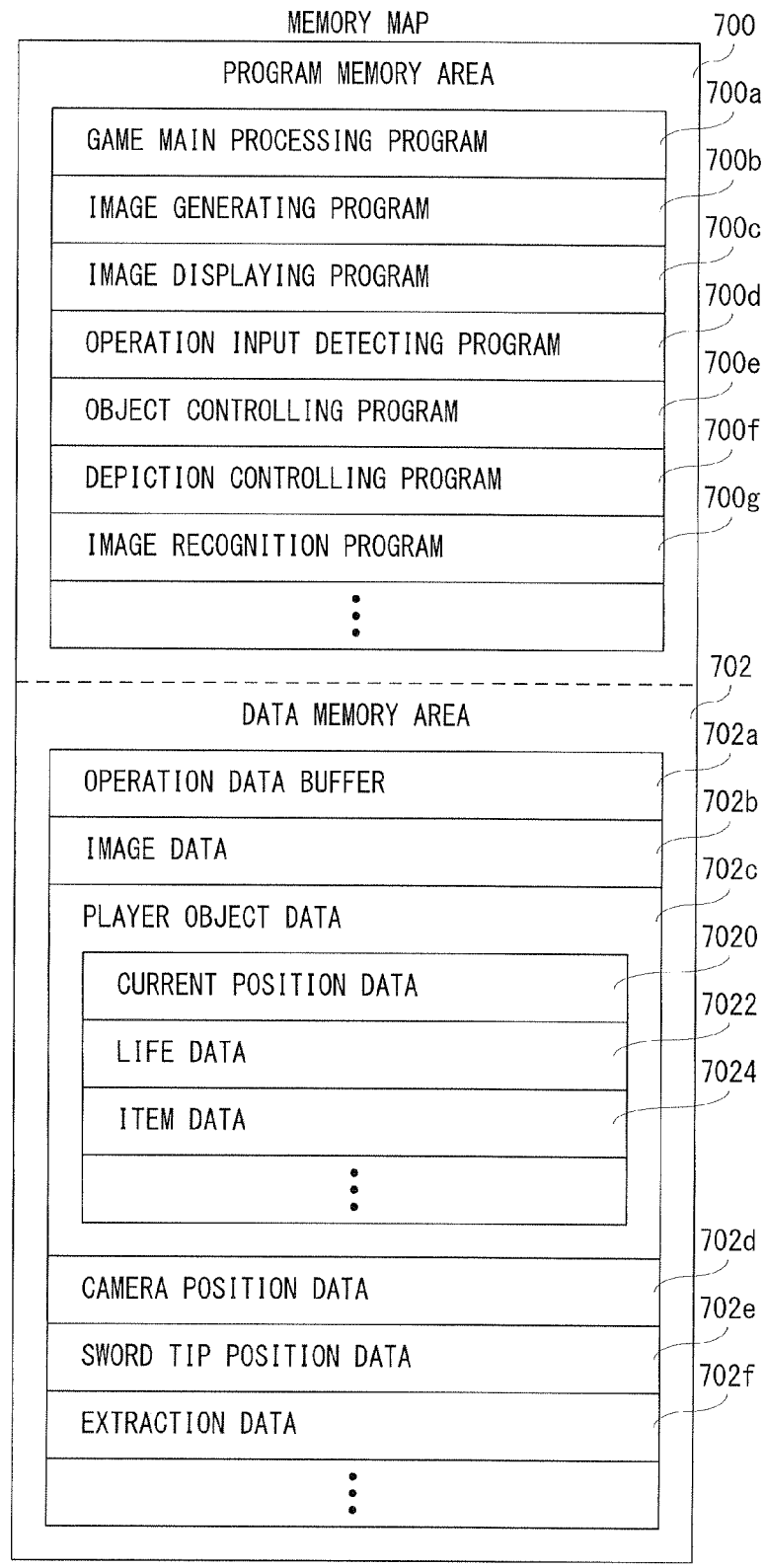
FIG. 20 shows an example non-limiting memory map of a main memory shown in FIG. 2.

FIG. 20 shows an example non-limiting memory map of a main memory (42e or 46) shown in FIG. 2. As shown in FIG. 20, the main memory (42e, 46) includes a program memory area 700 and a data memory area 702. In the program memory area 700, a game program including an image processing program is stored. The game program includes a game main processing program 700a, an image generating program 700b, an image displaying program 700c, an operation input detecting program 700d, an object controlling program 700e, a depiction controlling program 700f, an image recognition program 700g, etc. For example, the image processing program is made up of the image generating program 700b, the image displaying program 700c, the operation input detecting program 700d, the object controlling program 700e, the depiction controlling program 700f and the image recognition program 700g.

The game main processing program 700a is a program for processing a main routine of a virtual game of this embodiment. The image generating program 700b is a program for generating game image data corresponding to the screen (200, 300, etc.) to be displayed on the monitor 34 by using image data 702b described later. The screen displaying program 700c is a program for outputting (displaying and updating) game image data generated according to the image generating program 700b to the monitor 34.

The operation input detecting program 700d is a program for detecting controller data to be transmitted from the first controller 22. The object controlling program 700e is a program for moving, etc. the player object 202 according to the controller data, and arranging (making it appear), moving, etc. the non-player object, such as the enemy object 210, etc. independent of the controller data.

The depiction controlling program 700f is a program for arranging the two-dimensional surface 302 in the virtual three-dimensional space 500, detecting a depicting position on the two-dimensional surface 352, and erasing the two-dimensional surface 302 and the two-dimensional image 352. The image recognition program 700g is a program for recognizing (determining) whether the depicted two-dimensional image 352 is a predetermined image (heart image or circle image in this embodiment). Also, the image recognition program 700g makes the three-dimensional object corresponding to the predetermined image appear (occur) when the two-dimensional image 352 is recognized as the predetermined image.

Although illustration is omitted, in the program memory area 700, a sound output program and a backup program are also stored. The sound output program is a program for outputting and generating sound necessary for the game, such as voice (onomatopoeic sound) of the player object 202 and the enemy object 210, sound effect, music (BGM), etc. The backup program is a program for storing game data (proceeding data, result data) in the flash memory 44 and a memory card according to an instruction from the player and a predetermined game event.

The data memory area 702 is provided with an operation data buffer 702a. Also, in the data memory area 702, image data 702b, player object data 702c, camera position data 702d, sword tip position data 702e and extraction data 702f are stored.

The operation data buffer 702a is a buffer for storing (temporarily storing) controller data from the first controller 22 received in the wireless controller module 52 via the antenna 52a. The controller data stored in the operation data buffer 702a is used by the CPU 40 and then deleted (erased).

The image data 702b is data as to polygon data, texture data, and object data, etc. The player object data 702c is data as to the player object 202. For example, the player object data 702c includes current position data 7020, life data 7022, item data 7024, etc. The current position data 7020 is three-dimensional coordinate data of the current position of the player object 202. The life data 7022 is data as to a numerical value of the life of the player object 202. The item data 7024 is data as to the kind and the number of items possessed by the player objects 202.

Although illustration is omitted, the player object data 702c includes data as to the level of the player object 202, and kinds and attributes (offensive power and defensive power) of the equipped weapon (sword object 204, shield object 206).

The camera position data 702d is three-dimensional coordinate data as to the current position (camera location) of the viewpoint 502a of the virtual camera 502. The sword tip position data 702e is three-dimensional coordinate data as to the current position of the tip of the sword object 204. Here, the sword tip position data 702e is detected and updated when the two-dimensional image 352 is depicted. The extraction data 702f is data as to coordinates (three-dimensional coordinates) of dots extracted from the dots depicted on the two-dimensional surface 352 for depicting the two-dimensional image 352 every predetermined distance in chronological order. Here, the two-dimensional image 352 is depicted on the two-dimensional surface 302, and a depth value (Z value) may not be considered in the camera coordinate system, and thus, data as to the two-dimensional coordinates may be stored as extraction data 702f.

Although illustration is omitted, in the data memory area 702, sound data, etc. is stored, and flags and counters (timer) necessary for the game processing are also provided.

Figure 21:
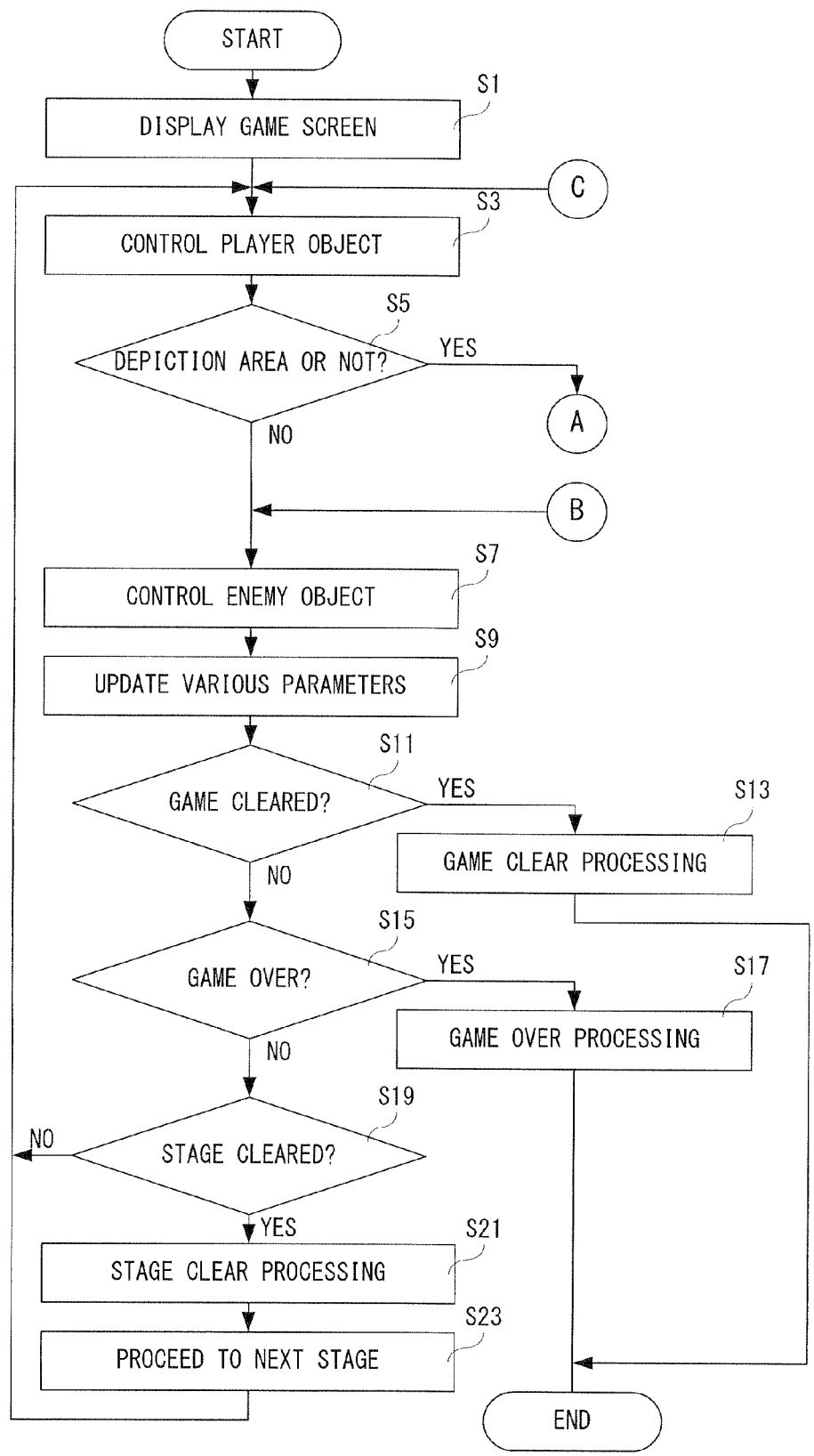
FIG. 21 shows an example non-limiting flowchart showing a part of game entire processing by a CPU shown in FIG. 2.

More specifically, the CPU 40 shown in FIG. 2 executes game entire processing shown in FIG. 21. Although illustration is omitted, detecting processing of the controller data transmitted from the controller 22 is executed in parallel with the game entire processing. That is, the CPU 40 stores controller data received via the antenna 52a and the wireless controller module 52 in the operation data buffer 702a within the main memory (42e, 46) for each frame.

When starting the game entire processing, the CPU 40 displays a game screen in a step S1. Here, in a case that the virtual game is started from the first, the CPU 40 displays an initial game screen of the virtual game on the monitor 34. Alternatively, in a case that the virtual game is started from the continuation of the previous play, the CPU 40 displays a game screen for starting the virtual game from the continuation of the previous play on the monitor 34.

In a next step S3, the player object 202 is controlled. Here, the CPU 40 moves the player object 202 and makes the player object 202 perform a predetermined action according to the controller data stored in the operation data buffer 702a. It should be noted that in a case that the player object 202 is moved, the CPU 40 stores three-dimensional coordinate data of the current position P after movement as current position data 7020 in the data memory area 702. That is, the current position data 7020 is updated. However, in a case that the data as to the control of the player object 202 is not included in the controller data, the process proceeds to a step S5 without execution of the processing in the step S3.

Successively, in the step S5, it is determined whether a depiction area or not. That is, it is determined whether or not the player object 202 exists in (reaches) the depiction area 510 designated by the designation image 252. If "YES" in the step S5, that is, if the depiction area 510 is, the process proceeds to a step S25 shown in FIG. 22. On the other hand, if "NO" in the step S5, that is, if not the depiction area 510, the enemy object 210 is controlled in a step S7. Here, the CPU 40 arranges the enemy object 210 (makes it appear). Furthermore, the CPU 40 makes the enemy object 210 move, and makes the enemy object 210 perform a predetermined action according to the game program.

Although detailed explanation is omitted, the player object 202 and the enemy object 210 encounter and fight with each other by the processing in the steps S3 and S7. Furthermore, the game screen is updated by these processing. In addition, although illustration is omitted, if the player object 202 obtains an item such as a three-dimensional object of a bomb by the processing in the step S3, the item is added as a possessed item while the item is erased from the possessed item when using the item.

In a next step S9, various parameters are updated. Here, the CPU 40 changes (increases or decreases) the life of the player object 202 and the enemy object 210, changes (increases) the level of the player object 202, and changes (decreases or increases) the offensive power and the defensive power of the player object 202.

Here, in a case that the player object 202 obtains an item such as a three-dimensional object of a heart by the processing in the step S3, the life of the player object 202 is increased by the processing in the step S9.

Successively, in a step S11, it is determined whether or not a game is cleared. For example, the CPU 40 determines whether or not the player or the player object 202 clears all the stages. If "YES" in the step S11, that is, if the game is cleared, game clear processing is executed in a step S13 to thereby end the game entire processing. For example, in the step S13, the CPU 40 displays a game screen representing a game clear on the monitor 34, and outputs sound or music representing it from the speaker 34a.

On the other hand, if "NO" in the step S11, that is, if the game is not cleared, it is determined whether or not the game is over in a step S15. For example, the CPU 40 determines whether or not the player object 202 is defeated based on the fact that the life of the player object 202 is equal to or less than 0. If "YES" in the step S15, that is, if the game is over, game over processing is executed in a step S17, and the game entire processing is ended. For example, in the step S17, the CPU 40 displays a game screen representing game over on the monitor 34, and outputs sound or music representing it from the speaker 34a.

Here, in a case that the game is cleared or the game is over, the game entire processing is ended, but the game entire processing may be ended according to an operation by the player. Although illustration is omitted, according to an operation by the player or a predetermined game event, backup processing of the game data may be executed.

Also, if "NO" in the step S15, that is, if the game is not over, it is determined whether or not the stage is cleared in a step S19. For example, the CPU 40 determines whether or not the player object 202 defeats the enemy object 210 being a boss in the current stage.

If "NO" in the step S19, that is, if the stage is not cleared, the process returns to the step S3 as it is. On the other hand, if "YES" in the step S19, that is, if the stage is to be cleared, stage clear processing is executed in a step S21. Here, the CPU 40 displays a game screen representing stage clear on the monitor 34, or outputs sound or music representing it from the speaker 34a.

In a next step S23, the game process proceeds to a next stage, and the process returns to the step S3. For example, in the step S23, the CPU 40 moves the player object 202 to an initial position (start point) of the next stage.

Figure 22:
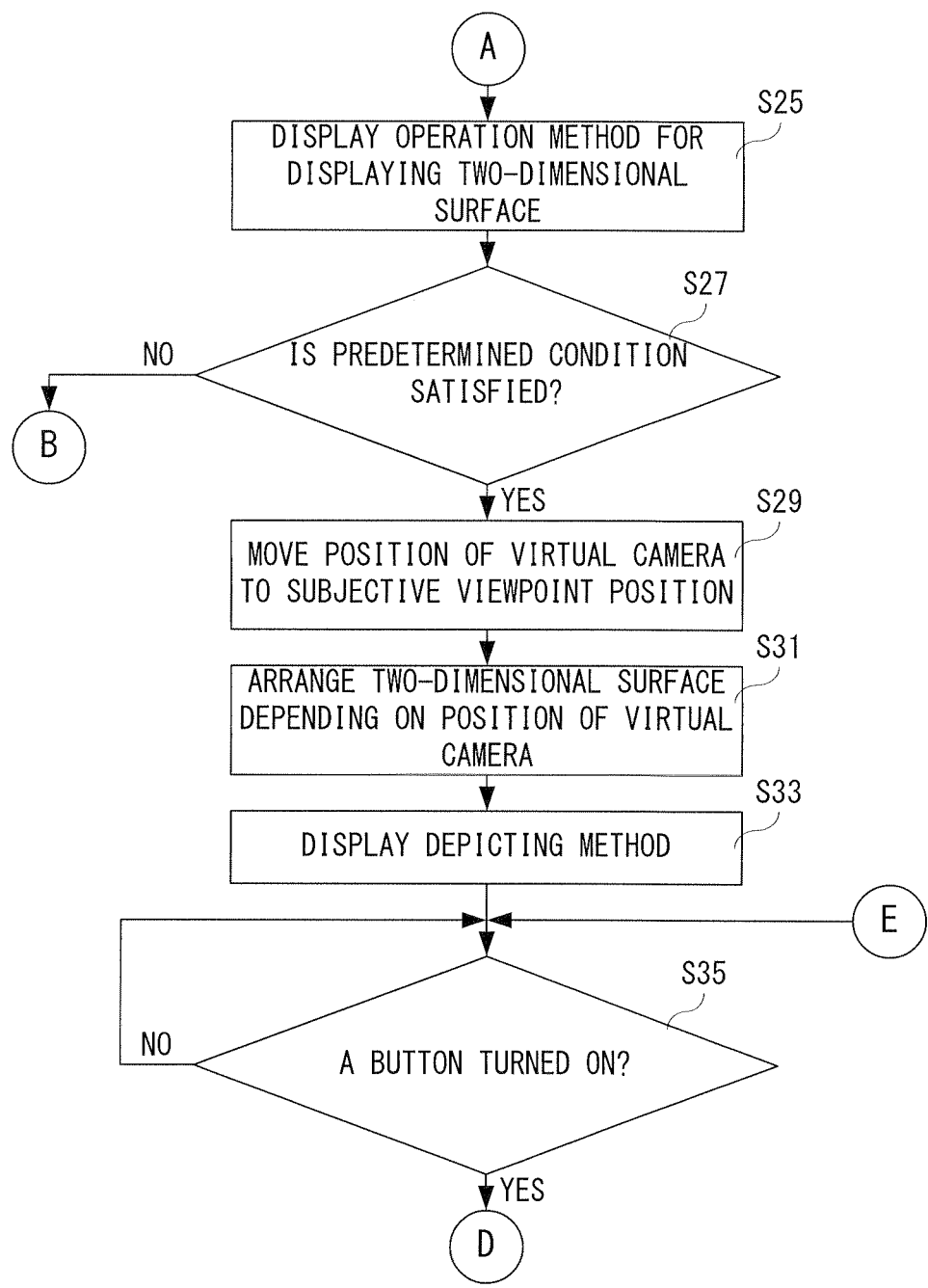
FIG. 22 shows an example non-limiting flowchart showing another part of the game entire processing by the CPU shown in FIG. 2 and being sequel to FIG. 21.

As shown in FIG. 22, in the step S25, an operation method for displaying a two-dimensional surface 302 is displayed. That is, the game screen 250 as shown in FIG. 11 is displayed. In a succeeding step S27, it is determined whether or not a predetermined condition is satisfied. Here, the CPU 40 determines whether or not the player operates a predetermined key, switch, or button, whether or not the player object 202 uses a predetermined item, whether or not the player object 202 beats a predetermined wall surface with the sword object 204, or whether or not the player object 202 performs a predetermined action, as described above.

If "NO" in the step S27, that is, if a predetermined condition is not satisfied, the process shifts to the step S7 shown in FIG. 21. On the other hand, if "YES" in the step S27, that is, if the predetermined condition is satisfied, the position of the virtual camera 502 is moved to the subjective viewpoint position in a step S29. That is, the virtual camera 502 is moved to the position of the head of the player object 202. In a next step S31, the two-dimensional surface 302 is arranged within the virtual three-dimensional space 500 depending on the position of the virtual camera 502. That is, the two-dimensional surface 302 is arranged so as to face the virtual camera 502, and have a predetermined distance d between the position of the viewpoint 502a and the position of the center 302a of the two-dimensional surface 302. Then, in a step S33, a depicting method is displayed. That is, the game screen 300 as shown in FIG. 12 is displayed on the monitor 34.

In a following step S37, it is determined whether or not the A button 26d is turned on. That is, by determining whether or not the A button 26d is turned on with reference to the controller data in the operation data buffer 702a, the CPU 40 determines whether or not start of depicting is instructed. If "NO" in the step S35, that is, if the A button 26d is turned off, the process returns to the same step S35 to wait for the A button 26d being turned on.

Figure 23:
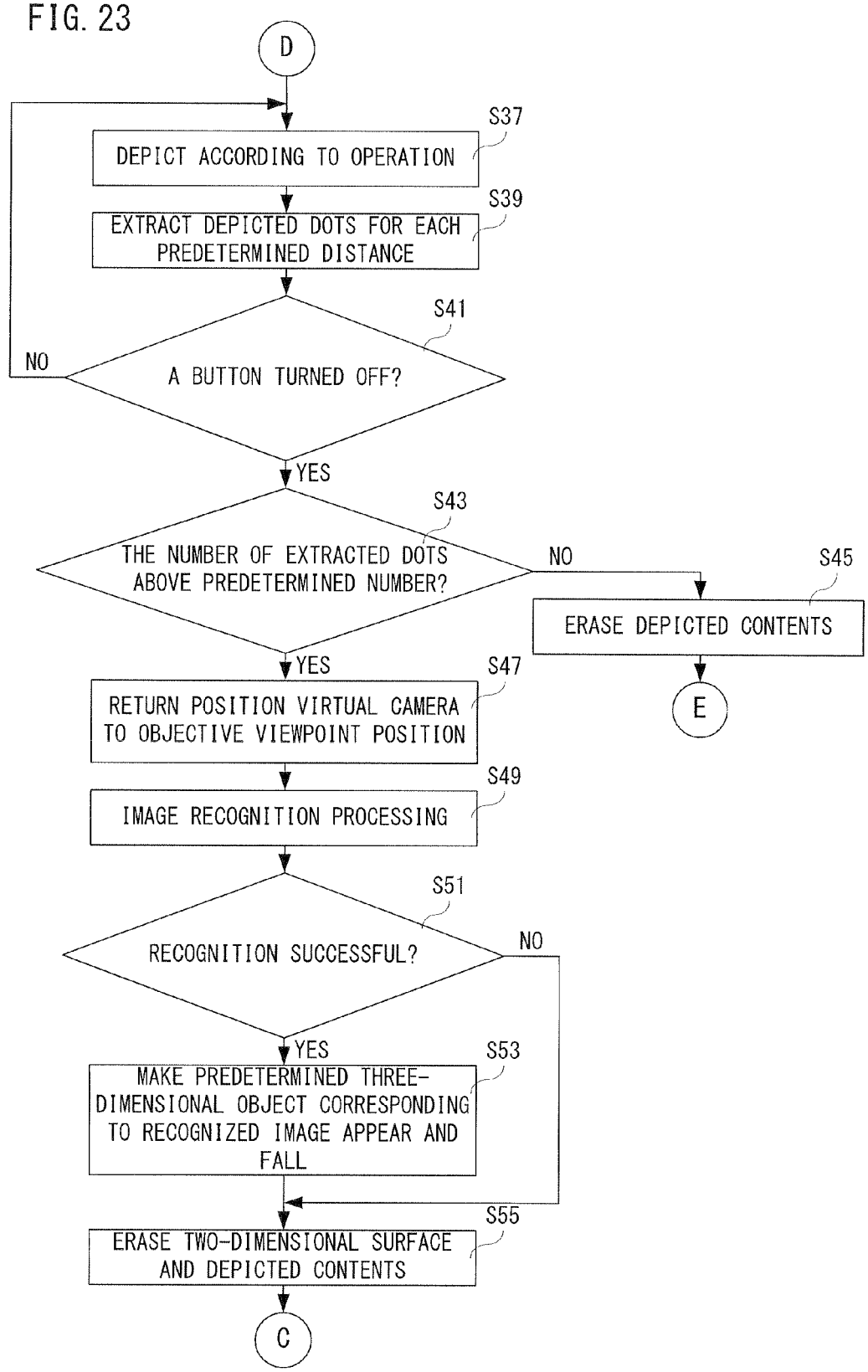
FIG. 23 shows an example non-limiting flowchart showing still another part of the game entire processing by the CPU shown in FIG. 2, and being sequel to FIG. 22.

On the other hand, if "YES" in the step S35, that is, if the A button 26d is turned on, it is determined that depicting is started, and depicting is performed according to the operation in the step S37 shown in FIG. 23. As described above, a two-dimensional dot 304 is displayed (depicted) at the intersection point between the line 520 passing through the position of the viewpoint 502a of the virtual camera 502 and the tip point 204a of the sword object 204, and the two-dimensional surface 302. Here, the CPU 40 calculates a yaw angle, a roll angle and a pitch angle on the basis of the angular velocity data included in the controller data stored in the operation data buffer 702a, that is, detects the attitude of the first controller 22, and moves, etc. the sword object 204 in correspondence therewith to thereby update the position of the tip point of the sword 204a at this time. That is, the sword tip position data 702e is updated. In a succeeding step S39, the dot 304 is extracted for each predetermined distance. Here, the three-dimensional coordinate data of the extracted dots 304 are stored (added to) in the data area 702. That is, the extraction data 702f is updated.

In a succeeding step S41, it is determined whether or not the A button 26d is turned off. If "NO" in the step S41, that is, if the A button 26d is turned on, it is determined that depicting is being made, and the process returns to the step S37. On the other hand, if "YES" in the step S41, that is, if the A button 26d is turned off, it is determined whether or not the number of extracted dots 304 is above a predetermined number (10, for example) in a step S43. If "NO" in the step S43, that is, if the number of extracted dots 304 is equal to or less than a predetermined number, the depicted contents, that is, the two-dimensional image 352 is erased in a step S45, and the process returns to the step S35 shown in FIG. 22. Here, in the step S45, all the extracted dots 304 are erased too.

On the other hand, if "YES" in the step S43, that is, if the number of extracted dots 304 is above a predetermined number, the position of the virtual camera 502 (viewpoint 502a) is returned to the objective viewpoint position in a step S47. That is, the position of the virtual camera 502 is moved to behind the player object 202. Accordingly, the game screen 400 shown in FIG. 17 is displayed on the monitor 34.

Successively, in a step S49, image recognition processing is executed. Here, the heart image recognition processing (determining processing) and the circle image determining processing as described above are executed. In a next step S51, it is determined whether or not recognition is successful. That is, it is determined whether or not the depicted two-dimensional image 352 is determined as the heart image or the circle image.

If "NO" in the step S51, that is, if recognition fails, the process proceeds to a step S55 as it is. On the other hand, if "YES" in the step S51, that is, if recognition is successful, a predetermined three-dimensional object (452) corresponding to the recognized image is made to appear and fall in a step S53. That is, the game screen 450 shown in FIG. 18 is displayed on the monitor 34, in which the three-dimensional object of the heart 452 then falls. Then, in a step S55, the two-dimensional surface 302 and the depicted contents are erased, and the process returns to the step S3 shown in FIG. 21. That is, according to the processing in the step S53 and S55, the depicted two-dimensional image (352) is converted into the corresponding three-dimensional object (452).

According to this embodiment, when the predetermined condition is satisfied, the two-dimensional surface is displayed in the virtual three-dimensional space, and a two-dimensional image depicted on the two-dimensional surface is converted into a three-dimensional object, and therefore, a difficulty level for depicting a two-dimensional image can be raised, capable of increasing fun of the game.

Additionally, in this embodiment, after starting to depict the two-dimensional image as well, the operation instructing image as to the depicting method is still displayed, but may be erased after starting to depict it. Also, the operation instructing image as to the depicting method may not be displayed in a case that depicting a two-dimensional image is a predetermined number of times (second time) onward, in a case that the virtual game proceeds to a certain degree, or in a case that the game level (level of the player object) is equal to or more than a predetermined value.

Similarly, in this embodiment, when the player object exists in (reaches) the depiction area, the operation instructing image as to the operation method for displaying the two-dimensional surface is displayed, but it may not be displayed in a case that the player object reaches the depiction area the predetermined number of times (second time) onward, in a case that the virtual game proceeds to a certain degree, or in a case that the game level (level of the player object) is equal to or more than the predetermined value.

Figure 24:
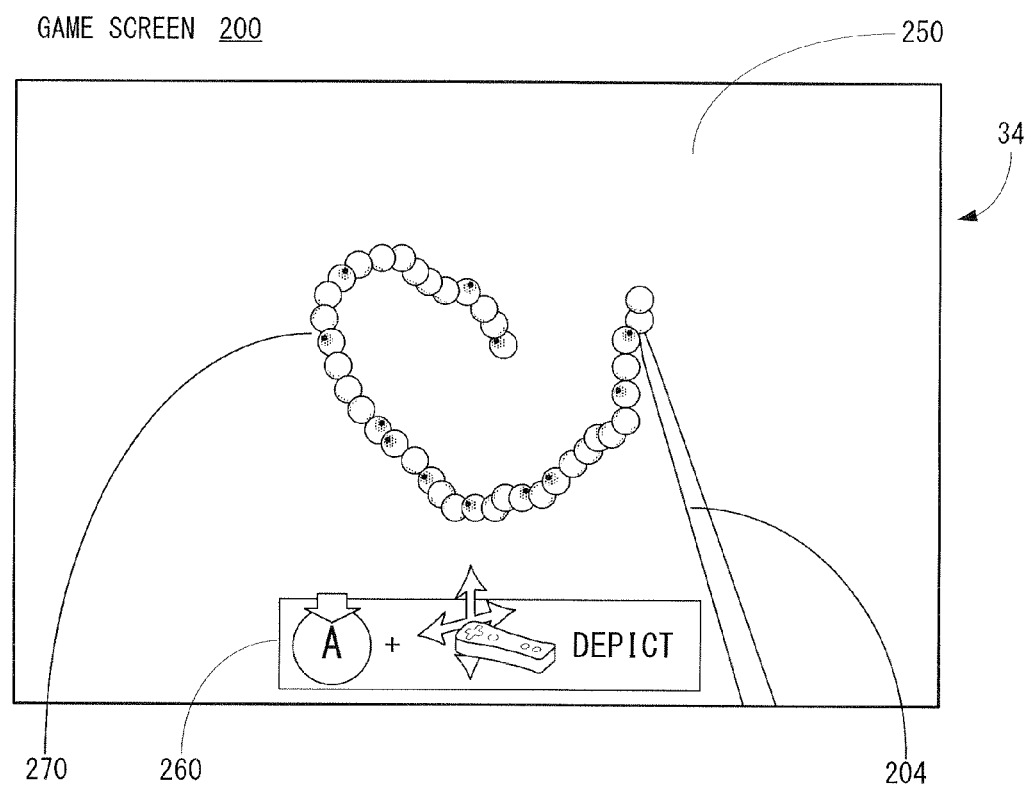
FIG. 24 shows another example non-limiting game screen displaying a three-dimensional object corresponding to the two-dimensional image depicted on the two-dimensional surface set to the virtual three-dimensional space.

In addition, in this embodiment, whether or not a two-dimensional image based on two-dimensional dots depicted on the two-dimensional surface is a predetermined image is determined, and if the predetermined image is, the two-dimensional image is converted into the predetermined three-dimensional object, but there is no need of being restricted thereto. For example, as shown in FIG. 24, when a two-dimensional image is depicted on the two-dimensional surface, three-dimensional dots (sphere) are arranged (displayed) to thereby display the content depicted in a two-dimensional manner with three-dimensional objects.

Furthermore, in this embodiment, by moving the sword object held by the player object on the basis of the angular velocity data included in the controller data transmitted from the first controller, a two-dimensional image is depicted on the two-dimensional surface, but there is no need of being restricted thereto. For example, the sword object can also be moved on the basis of the acceleration data included in the controller data to be transmitted from the first controller. Moreover, the tip point of the sword object can be moved on the basis of the marker coordinate data included in the controller data to be transmitted from the first controller. That is, by using the pointing device, the two-dimensional image can be depicted. Furthermore, as a pointing device, a touch panel, a computer mouse, etc. can be used.

In addition, the example embodiment can be applied to an image processing system in which each processing (programs 700b-700g) for image processing is distributedly performed by a plurality of computers, etc.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. A non-transitory storage medium storing an image processing program of an image processing apparatus including an input device, said image processing program causes a computer of said image processing apparatus to at least:
output an image obtained by imaging a virtual three-dimensional space with a virtual camera;
determine whether or not a predetermined condition is satisfied;
generate a two-dimensional surface in said virtual three-dimensional space when it is determined that said predetermined condition is satisfied;
determine an attitude based on information acquired from the input device; and
draw, in the virtual three-dimensional space, a two-dimensional image on said two-dimensional surface on the basis of the determined attitude.

2. A non-transitory storage medium according to claim 1, wherein,
the two-dimensional surface is generated at a position a predetermined distance away from said virtual camera, and
a dot is depicted at an intersection point between a straight line extending from said virtual camera to said two-dimensional surface and said two-dimensional surface.

3. A non-transitory storage medium according to claim 2, wherein the image processing program further causes the computer of said image processing apparatus to
arrange a predetermined object in the virtual three-dimensional space;
move the predetermined object according to an operation by said input device,
said straight line passes through a position of the virtual camera and a predetermined point of said predetermined object.

4. A non-transitory storage medium according to claim 3, wherein
said predetermined object includes a player object, and
said predetermined condition is that said player object to be controlled according to an operation by said input device reaches a predetermined position or a predetermined area in said virtual three-dimensional space.

5. A non-transitory storage medium according to claim 4, wherein the image processing program causes the computer of the image processing apparatus to further:
output an image of an objective viewpoint when said virtual camera is arranged behind said player object before said predetermined condition is satisfied; and
output an image of a subjective viewpoint when said virtual camera is arranged on said player object after said predetermined condition is satisfied.

6. A non-transitory storage medium according to claim 1, wherein
said predetermined condition is that a predetermined operation is performed by said input device.

7. A non-transitory storage medium according to claim 6, wherein
said predetermined operation includes determining that said input device has adopted a predetermined attitude.

8. A non-transitory storage medium according to claim 1, wherein
said image processing program further causes said computer to display a three-dimensional object based on the drawn two-dimensional image.

9. A non-transitory storage medium according to claim 8, wherein
said image processing program further causes said computer to erase said two-dimensional surface from said virtual three-dimensional space when said three-dimensional object is generated.

10. A non-transitory storage medium according to claim 8, wherein
said image processing program further causes said computer to determine whether or not the drawn two-dimensional image is a predetermined image.

11. A non-transitory storage medium according to claim 10, wherein
said image processing program further causes said computer to determine whether or not said two-dimensional image is said predetermined image on the basis of at least the number of corners included in said two-dimensional image and position of said corners within a range surrounding said two-dimensional image.

12. A non-transitory storage medium according to claim 10, wherein
said image processing program further causes said computer to determine whether or not said two-dimensional image is said predetermined image on the basis of at least the number of dots included in each area in a case that a range surrounding said two-dimensional image is equally divided, a horizontal to vertical ratio of said two-dimensional image, and the number of corners included in said two-dimensional image.

13. A non-transitory storage medium according to claim 8, wherein the three-dimensional object is prepared in advance in relation to being displayed.

14. An image processing apparatus comprising:
   an input device; and
   a computer processing system comprising at least one computer processor, the computer processing system is configured to:
      determine whether or not a predetermined condition is satisfied;
      generate a two-dimensional surface in a virtual three-dimensional space when it is determined that the predetermined condition is satisfied;
      determine an attitude based on information acquired from the input device; and
      draw, in the virtual three-dimensional space, a two-dimensional image in the virtual three-dimensional space and on the two-dimensional surface of the virtual three-dimensional space based on the determined attitude.

15. An image processing method of an image processing apparatus including an input device, the image processing method comprising:
   outputting an image obtained by imaging a virtual three-dimensional space with a virtual camera;
   determining whether or not a predetermined condition is satisfied;
   generating a two-dimensional surface in said virtual three-dimensional space when it is determined that said predetermined condition is satisfied;
   determining an attitude based on information acquired from the input device; and
   drawing a two-dimensional image on said two-dimensional surface of the virtual three-dimensional space in correspondence with the determined attitude, where the two-dimensional image is drawn in the virtual three-dimensional space.

* * * * *